US009058717B2

(12) United States Patent
Aoki et al.

(10) Patent No.: US 9,058,717 B2

(45) **Date of Patent: *Jun. 16, 2015**

(54) MULTI-GAME VIDEO POKER MACHINE AND SYSTEM WITH ASYMMETRICALLY ACCESSIBLE CUSTOMIZATION FEATURES

(71) Applicant: WMS Gaming Inc., Waukegan, IL (US)

(72) Inventors: Dion K. Aoki, Henderson, NV (US); Allon G. Englman, Chicago, IL (US); Joel R. Jaffe, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,857

(22) Filed: Nov. 25, 2013

(65) Prior Publication Data

US 2014/0087872 A1 Mar. 27, 2014

Related U.S. Application Data

(63) Continuation of application No. 13/287,545, filed on Nov. 2, 2011, now Pat. No. 8,613,648.

(60) Provisional application No. 61/409,423, filed on Nov. 2, 2010.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3211* (2013.01); *G07F 17/3227* (2013.01)

(58) Field of Classification Search

USPC ................................ 463/1, 16–20, 29, 40–43

See application file for complete search history.

(56) References Cited

U.S. PATENT DOCUMENTS

| | | | |
|---|---|---|---|
| 4,743,022 | A | 5/1988 | Wood |
| 5,294,120 | A | 3/1994 | Schultz |
| 5,308,065 | A | 5/1994 | Bridgeman et al. |
| 5,322,295 | A | 6/1994 | Cabot et al. |
| 5,401,023 | A | 3/1995 | Wood |
| 5,431,408 | A | 7/1995 | Adams |
| 5,437,451 | A | 8/1995 | Fulton |
| 5,489,101 | A | 2/1996 | Moody |

(Continued)

FOREIGN PATENT DOCUMENTS

| | | |
|---|---|---|
| WO | 97/27570 | 7/1997 |
| WO | 03/083795 | 10/2003 |

(Continued)

OTHER PUBLICATIONS

Draw Poker Variants, web page (6 pages).

(Continued)

*Primary Examiner* — Milap Shah

(74) *Attorney, Agent, or Firm* — Nixon Peabody LLP

(57) ABSTRACT

A gaming system with asymmetric customization capabilities and a method of enabling asymmetric customization of a wagering game are disclosed. A plurality of selectable game-play features are provided for utilization during the wagering game. Players accessing the game-play features are unequally limited as to which features are available for modification, depending on means of access. All features, however, are available for game-play, regardless of means of access.

19 Claims, 17 Drawing Sheets

(56) References Cited

U.S. PATENT DOCUMENTS

| | | | | |
|---|---|---|---|---|
| 5,511,781 | A | 4/1996 | Wood et al. | |
| 5,531,448 | A | 7/1996 | Moody | |
| 5,732,950 | A | 3/1998 | Moody | |
| 5,816,916 | A | 10/1998 | Moody | |
| 5,823,873 | A | 10/1998 | Moody | |
| 5,848,934 | A | 12/1998 | Shiels et al. | |
| 5,868,619 | A | 2/1999 | Wood et al. | |
| 5,882,259 | A | 3/1999 | Holmes, Jr. | |
| 5,954,335 | A | 9/1999 | Moody | |
| 5,957,774 | A | 9/1999 | Holmes, Jr. et al. | |
| 5,976,016 | A | 11/1999 | Moody et al. | |
| 6,007,066 | A | 12/1999 | Moody | |
| 6,012,720 | A | 1/2000 | Webb | |
| 6,045,129 | A | 4/2000 | Cooper et al. | |
| 6,098,985 | A | 8/2000 | Moody | |
| 6,110,040 | A | 8/2000 | Sanduski et al. | |
| 6,120,378 | A | 9/2000 | Moody et al. | |
| 6,132,311 | A | 10/2000 | Williams | |
| 6,149,521 | A | 11/2000 | Sanduski | |
| 6,206,780 | B1 | 3/2001 | Awada | |
| 6,248,016 | B1 | 6/2001 | Walker et al. | |
| 6,257,979 | B1 | 7/2001 | Walker et al. | |
| 6,280,328 | B1 | 8/2001 | Holch et al. | |
| 6,336,860 | B1 | 1/2002 | Webb | |
| 6,416,407 | B1 | 7/2002 | Carrico et al. | |
| 6,461,240 | B1 | 10/2002 | Perkins | |
| 6,471,587 | B1 | 10/2002 | Wood et al. | |
| 6,474,645 | B2 | 11/2002 | Tarantino | |
| 6,494,454 | B2 | 12/2002 | Adams | |
| 6,517,433 | B2 | 2/2003 | Loose et al. | |
| 6,561,898 | B2 | 5/2003 | Moody | |
| 6,569,013 | B1 | 5/2003 | Taylor | |
| 6,569,014 | B2 | 5/2003 | Walker et al. | |
| 6,595,520 | B1 | 7/2003 | Richards et al. | |
| 6,595,852 | B2 | 7/2003 | Wang | |
| 6,612,926 | B1 | 9/2003 | Dabrowski | |
| 6,612,927 | B1 | 9/2003 | Slomiany et al. | |
| 6,616,142 | B2 | 9/2003 | Adams | |
| 6,637,747 | B1 | 10/2003 | Garrod | |
| 6,672,958 | B2 | 1/2004 | Bennett | |
| 6,708,975 | B1 | 3/2004 | Fox et al. | |
| 6,726,427 | B2 | 4/2004 | Jarvis et al. | |
| 6,780,106 | B2 | 8/2004 | DeMar et al. | |
| 6,857,957 | B2 | 2/2005 | Marks et al. | |
| 7,722,453 | B2 | 5/2010 | Lark et al. | |
| 7,753,789 | B2 * | 7/2010 | Walker et al. | 463/42 |
| 7,883,413 | B2 * | 2/2011 | Paulsen | 463/29 |
| 8,613,648 | B2 * | 12/2013 | Aoki et al. | 463/16 |
| 2002/0013173 | A1 * | 1/2002 | Walker et al. | 463/40 |
| 2002/0034974 | A1 | 3/2002 | Wood et al. | |
| 2002/0142825 | A1 * | 10/2002 | Lark et al. | 463/16 |
| 2002/0142846 | A1 * | 10/2002 | Paulsen | 463/43 |
| 2002/0151366 | A1 | 10/2002 | Walker et al. | |
| 2002/0169015 | A1 | 11/2002 | Moody | |
| 2002/0185816 | A1 | 12/2002 | Moody et al. | |
| 2003/0003988 | A1 | 1/2003 | Walker et al. | |
| 2003/0027626 | A1 | 2/2003 | Marks et al. | |
| 2003/0032469 | A1 | 2/2003 | Moody et al. | |
| 2003/0038425 | A1 | 2/2003 | Tarantino | |
| 2003/0045354 | A1 | 3/2003 | Giobbi | |
| 2003/0064773 | A1 | 4/2003 | Baerlocher et al. | |
| 2003/0119572 | A1 | 6/2003 | Moody et al. | |
| 2003/0119579 | A1 | 6/2003 | Walker et al. | |
| 2003/0153377 | A1 | 8/2003 | Lisowski, Sr. | |
| 2003/0166411 | A1 | 9/2003 | Moody | |
| 2003/0181232 | A1 | 9/2003 | Peccola, Jr. | |
| 2003/0186733 | A1 | 10/2003 | Wolf et al. | |
| 2003/0189290 | A1 | 10/2003 | Moody | |
| 2003/0195031 | A1 | 10/2003 | O'Donovan et al. | |
| 2003/0214097 | A1 | 11/2003 | Moody | |
| 2003/0236115 | A1 | 12/2003 | Chamberlain | |
| 2004/0043807 | A1 | 3/2004 | Pennington | |
| 2004/0132524 | A1 | 7/2004 | Ramstad et al. | |
| 2004/0248641 | A1 | 12/2004 | Jarvis et al. | |
| 2006/0148560 | A1 | 7/2006 | Arezina et al. | |
| 2006/0211494 | A1 | 9/2006 | Helfer | |
| 2007/0225076 | A1 | 9/2007 | Aida | |
| 2007/0243925 | A1 | 10/2007 | LeMay et al. | |
| 2007/0243934 | A1 | 10/2007 | Little et al. | |
| 2007/0265055 | A1 | 11/2007 | Berman | |
| 2007/0293319 | A1 | 12/2007 | Stamper et al. | |
| 2008/0045317 | A1 | 2/2008 | Seelig et al. | |
| 2008/0045338 | A1 | 2/2008 | Walker et al. | |
| 2008/0076519 | A1 | 3/2008 | Chim | |
| 2008/0171588 | A1 | 7/2008 | Atashband | |
| 2008/0287197 | A1 | 11/2008 | Ruppert et al. | |
| 2009/0264203 | A1 | 10/2009 | Warkentin | |
| 2009/0298583 | A1 | 12/2009 | Jones | |
| 2010/0304829 | A1 | 12/2010 | Yamauchi | |
| 2011/0143834 | A1 | 6/2011 | Guinn et al. | |
| 2011/0244952 | A1 | 10/2011 | Schueller et al. | |

FOREIGN PATENT DOCUMENTS

| | | |
|---|---|---|
| WO | 2006/102441 | 9/2006 |
| WO | 2007/089410 | 8/2007 |

OTHER PUBLICATIONS

"Pay It Again Poker" Product Sheet, GameTech, Inc., 2 pages (Dated prior to Jul. 2, 2009).

* cited by examiner

MULTI-GAME VIDEO POKER MACHINE AND SYSTEM WITH ASYMMETRICALLY ACCESSIBLE CUSTOMIZATION FEATURES

CROSS-REFERENCE TO RELATED APPLICATION

This application is a continuation of U.S. application Ser. No. 13,287,545, filed Nov. 2, 2011, now U.S. Pat. No. 8,613, 648, which claims priority to U.S. Provisional Application No. 61/409,423 entitled "Multi-Game Video Poker Machine And System With Asymmetrically Accessible Customization Features" filed on Nov. 2, 2010, both of which are being incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to poker-themed wagering games and bonus features with asymmetric customization capabilities dependent on the device and site from which the features are accessed.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

Video draw poker has been played in gaming establishments for many years. In conventional video draw poker, a single player does not play against a dealer or other players, but rather attempts to achieve a highest possible poker-hand ranking. After a player makes an initial wager and is dealt five face-up cards from a standard 52-card deck, the player is allowed to discard and replace unwanted cards with replacement cards from the deck, resulting in a final card hand. The game then determines a poker-hand ranking of the final card hand and provides an award based on a paytable. The paytable includes a list of winning poker-hand rankings and the award for each ranking. The winning poker-hand rankings for a standard Jacks or Better video poker game include in order from highest to lowest: Royal Flush, Straight Flush, Four of a Kind, Full House, Flush, Straight, Three of a Kind, Two Pair and a Pair of Jacks or Better. Any poker hand having a ranking less than a Pair of Jacks or Better is a losing hand.

Manufacturers have developed variations to conventional video draw poker. One objective in developing such variations is to differentiate a video poker product from that of the competition. Another objective is to increase the speed of play and/or the number of coins or credits wagered. As casino patrons become bored or annoyed with existing variations to conventional video draw poker, gaming establishments are continually looking for new video poker games that will attract frequent play and hence increase profitability to the gaming establishment.

One way to increase player participation and enthusiasm for a game or a family of games is by adding a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Another concept that has been successfully employed to enhance the entertainment value of a game is to add a social networking aspect to the gaming website. Social communication and social networking is on the rise. Internet users are enjoying a proliferation of social networking mechanisms (e.g., social networking websites, online chats, blogging, social networking applications, electronic mail or "e-mail," text messaging, etc.) that are appearing online in vast quantities. Many wagering game companies are discovering the value of integrating wagering games with social networking mechanisms. Some wagering game companies have created online gaming websites that provide a way for wagering game enthusiasts to play games and interact with each other while connected to a communications network such as the Internet (e.g., via a web-browser). Some of those online gaming websites also provide social networks and social networking functionality. Social networks allow wagering game players ("players") to create social network user accounts ("player accounts") with one or more unique identifiers that represent an online persona. An online persona can be a graphical depiction (i.e., an avatar) of social network persona, and can be simply a player identification number related to a particular player. These online personas and associated avatars add to the fun of belonging to a social network. In some cases, players can utilize a gaming website to engage in non-wagering games that are related to the wagering games offered in casinos. Players can unlock content and accrue features via the gaming website, and those features and content can then be accessed at a gaming terminal. Furthermore, many social networking websites are expanding their capabilities to integrate with content providers, including wagering game providers. Thus, some online gaming websites and some social networking websites are continually looking to integrate and/or incorporate each other's features.

Yet another way to increase player interest via online gaming websites is to provide the opportunity for enhanced game play features, such as bonus games, special game content and player avatars, and customization capabilities, to players who frequent websites from remote devices. Players can obtain player account numbers from the website and then use the player accounts to store special features accrued online for use at the gaming terminal. Players at the gaming terminal can input their player account numbers to access and play the game play features that were accrued online and stored in the account.

SUMMARY OF THE INVENTION

According to one embodiment, a gaming system with asymmetric customization capabilities comprises one or more processors and a communications interface. The one or more processors are operable to, in response to detecting, via the one or more communication interfaces, a player request from a gaming terminal, enable the player to modify a feature of the terminal set but not a feature the enhanced set. The one or more processors are also operable to, in response to detecting, via the one or more communication interfaces, a player request from a remote device, enable the player to modify a feature of the terminal set and a feature of the enhanced set, and apply both the terminal set and the feature set to the wagering game while the wagering game is played via the gaming terminal.

In another embodiment, a gaming system with asymmetric customization capabilities comprises a game server including server memory, the game server being accessible via a communications network. The gaming system further comprises one or more processors that are operable to recall, via the communications network, a terminal set of selectable game-play features and an enhanced set of selectable game-play features from a server memory storage site on the game server. Additionally, in response to a player request from a gaming terminal, the one or more processors enable the player to modify a feature of the terminal set but not a feature the enhanced set and, in response to a player request from a remote device, enable the player to modify a feature of the terminal set and a feature of the enhanced set. Also, the one or more processors save, via the communications network, the terminal set and the enhanced set in the server memory storage site, and apply both the terminal set and the feature set to the wagering game while the wagering game is played via the gaming terminal.

In another embodiment, a method of enabling asymmetric customization of a wagering game playable via a gaming system including one or more processors and a communications interface, where the wagering game includes an enhanced set of selectable game-play features, comprises, in response to detecting, via the communications interface, a player request from a remote device to modify the enhanced set, enabling the player to modify all the features in the enhanced set, and in response to detecting, via the communications interface, a player request from a gaming terminal, enabling the player to modify only a subset of the features in the enhanced set, and applying, via the one or more processors, the enhanced set to the wagering game while the wagering game is played via the gaming terminal.

In yet another embodiment, a method of enabling asymmetric customization of a wagering game playable via a gaming terminal, where the wagering game includes a terminal set of selectable game-play features and an enhanced set of selectable game-play features, comprises logging in, via a communications network, to a player account associated with a gaming community and stored in a memory storage site, and recalling the terminal set and the enhanced set from the player account. Also, in response to a player request from the gaming terminal, the method includes enabling the player to modify a feature of the terminal set but not a feature of the enhanced set, and in response to a player request from the remote device, enabling the player to modify a feature of the terminal set and a feature of the enhanced set, and also applying the terminal set and the enhanced set to the wagering game from the player account while the game is played via the gaming terminal.

DETAILED DESCRIPTION

Figure 1:
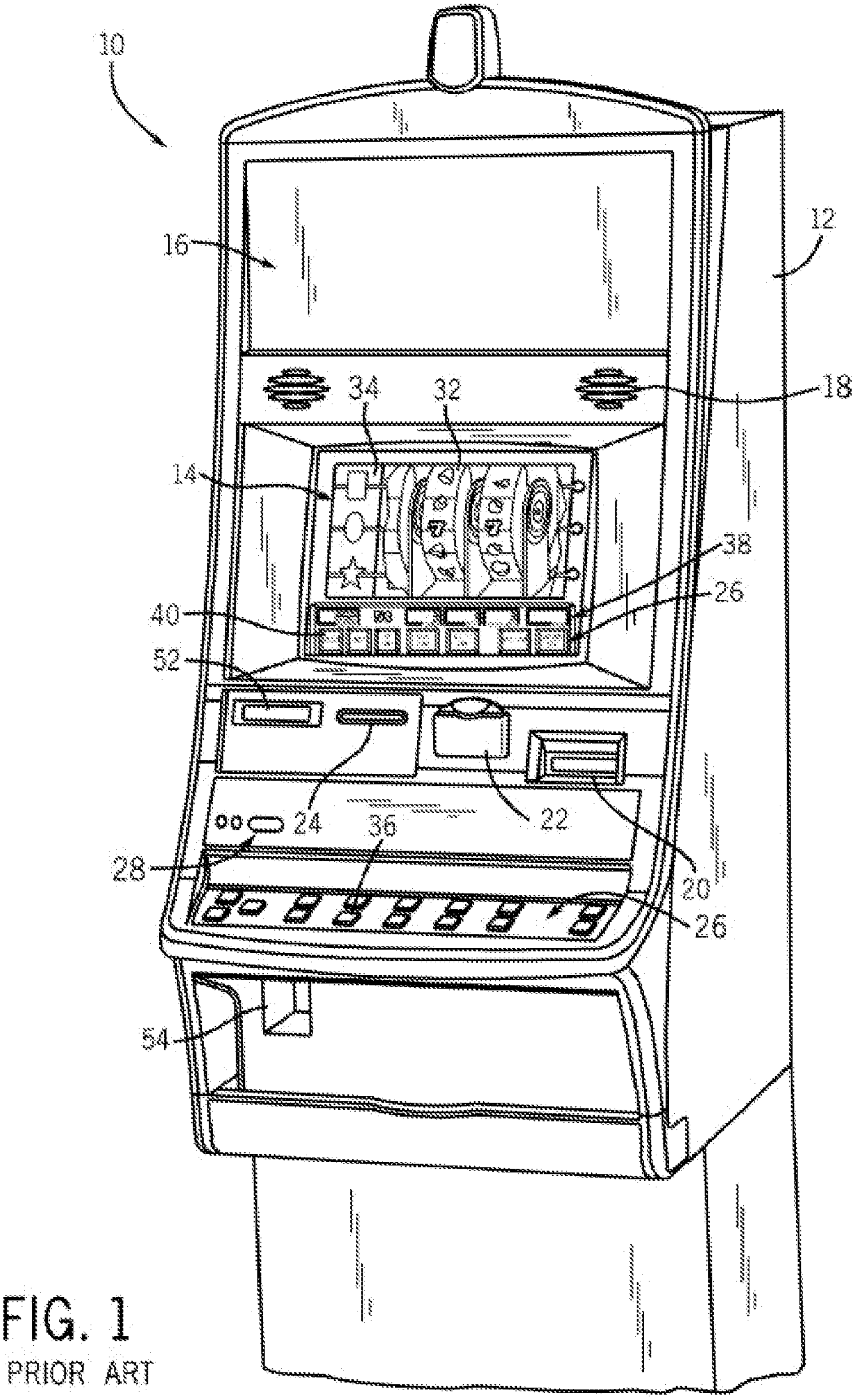
FIG. 1 PRIOR ART
FIG. 1 is a perspective view of a free-standing gaming terminal according to an embodiment of the invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in land-based gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 26, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, e-mails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 can include, in relation to many aspects of wagering games conducted on the gaming terminal 10, one or more paylines extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354 entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
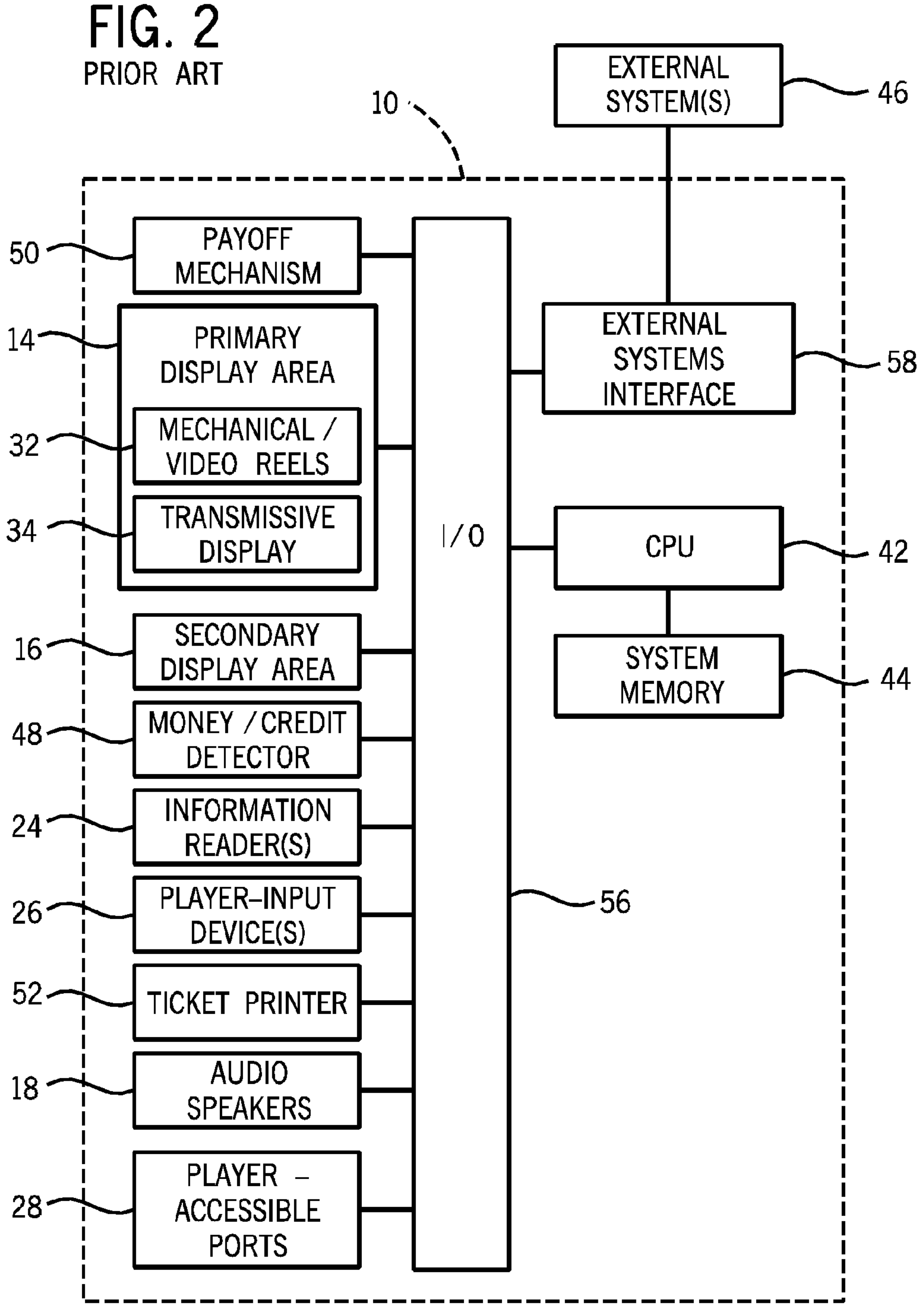
FIG. 2 PRIOR ART
FIG. 2 is a schematic view of a gaming system according to an embodiment of the invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor.

Although FIG. 2 indicates the controller 42 and an associated system memory 44 are contained with the gaming terminal 10, in various embodiments the controller 42 and system memory 44 can be separate components—both separate from the terminal and separate from each other. In some embodiments, the terminal can be controlled by a distributed controller spread among many distinct sites and communicating via a communications network. By way of example, the controller 42 can include a plurality of microprocessors including a master processor, a slave processor, and a secondary or parallel processor. Controller 42, as used herein, can comprise any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. Similarly, the controller 42 can comprise a slave controller that receives instructions from a separate processor(s) via a communication interface associated with the separate processor(s). The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming terminal 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 can include at least one memory storage site. The system memory 44 can comprise a volatile memory (e.g., a random-access memory (RAM)) and a non-volatile memory (e.g., an EEPROM), and can optionally include multiple RAM and multiple program memories. Also, the system memory 44 can comprise distributed memory, cloud memory, and variations and combinations of any of the aforementioned.

As shown in the example of FIG. 2, the controller 42 is also coupled to a money/credit detector 48. The money/credit detector 48 is configured to output a signal to the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more paytables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to a communications interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

In some embodiments, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a gaming terminal or remote device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

At least one embodiment of the invention is directed to a basic poker-themed game adapted to be displayed on the primary display area 14. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game such as the poker-themed wagering game shown in FIGS. 3 and 4 that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel 26, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display area 14) through the display of information such as, but not limited to, text, graphics, text and graphics, static images, moving images, etc., or any combination thereof. In accord with the method of conducting the wagering game, the controller 42, which comprises one or more processors, transforms a physical player input, into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

An embodiment of the invention, a multi-game video poker game played via a gaming terminal 10, includes many features and capabilities that can also be utilized across a spectrum of wagering games. For clarity and brevity, the following will describe these features and capabilities as applied to the video poker game, but it will be clear to a person having ordinary skill in the art (PHOSITA) that these same features and variations thereof can be incorporated in other wagering games while still embodying the inventive and novel principles of the invention.

Figure 3:
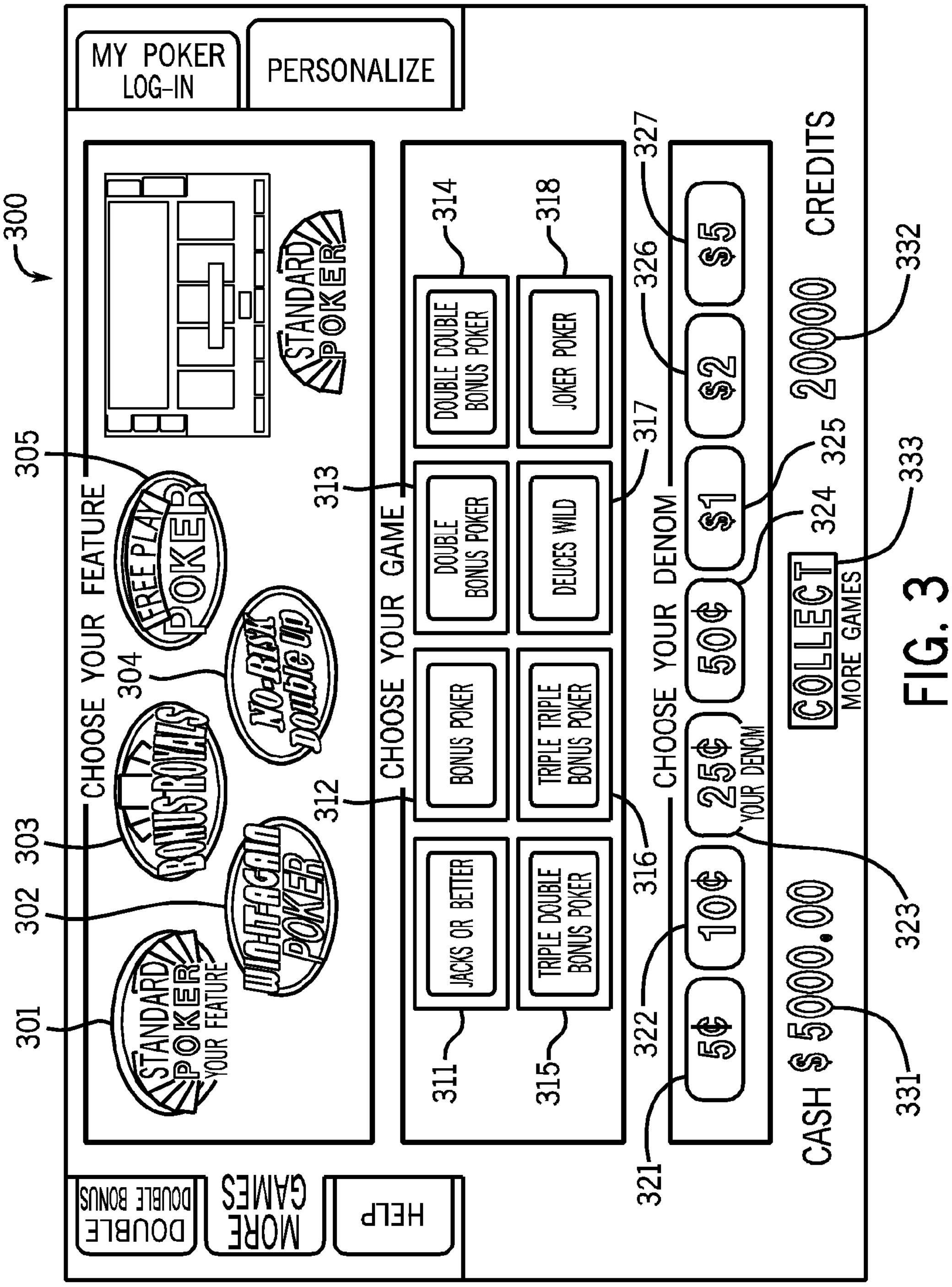
FIG. 3 is image of an introductory selection screen according to an embodiment of a multi-game video poker-game.

In FIG. 3, the image of the video poker game includes an introductory selection screen 300 that enables a player to make selections for executing a poker game with a desired bonus feature, paytable, and bet denomination. The introductory screen 300 includes touch screen buttons (which could also be embodied as mechanical, soft touch, etc.) such as a bonus feature button 301-305, a basic game button 311-318, a "COLLECT" button 333, and a denomination button 321-327. Also included on the introductory screen are game meters 331-332 showing the players available credits (and dollar value.)

In an embodiment, the video poker game can comprise a plurality of different basic poker games. The basic games shown in FIG. 3 are all variations of a five-card draw poker game, and the basic games can be played with symbol-objects such as a single standard 52-card deck (i.e., Ace through King of four different suits). However, a poker game may be played with any number of decks and/or with a variety of different card compositions (e.g., additional value objects, wild cards, etc.).

According to one example, during a particular poker hand, all of the cards are dealt from the same deck. After a card is dealt from the deck into the poker hand, the card is "used up" and cannot appear again until the next poker hand. The deck may be replenished and randomly shuffled prior to every poker hand. The system memory 44 includes a data structure for storing data representing each card of the deck. The controller 42 randomly selects cards for each poker hand from the data structure and controls the primary display area 14 to display the cards.

Variations on the basic five-card draw poker game offered in the video poker game can include but are not limited to:

- Jacks or Better where payoffs begin at a pair of Jacks.
- Bonus Poker including bonus pays for any 2s, 3s, and 4s four-of-a-kind hands, as well as a bonus pay for four Aces.
- Double Bonus Poker which doubles the bonus payoffs for four-of-a-kind hands.
- Double Double Bonus Poker which adds bonus payoffs for four-of-a-kind hands with certain "kicker" fifth cards.
- Triple Double Bonus Poker where the payoff for four Aces with a 2, 3, or 4 kicker card is the same as the payoff for a Royal Flush.
- Deuces Wild Poker where any 2 in a hand can substitute for any other card, making five-of-a-kind hands possible.
- Joker Poker which adds one Joker to a standard 52 card deck, and the Joker can substitute for any other card.

The abovementioned variations can be augmented by additional variations and additional games, and they can be modified from the descriptions provided herein.

Figure 4:
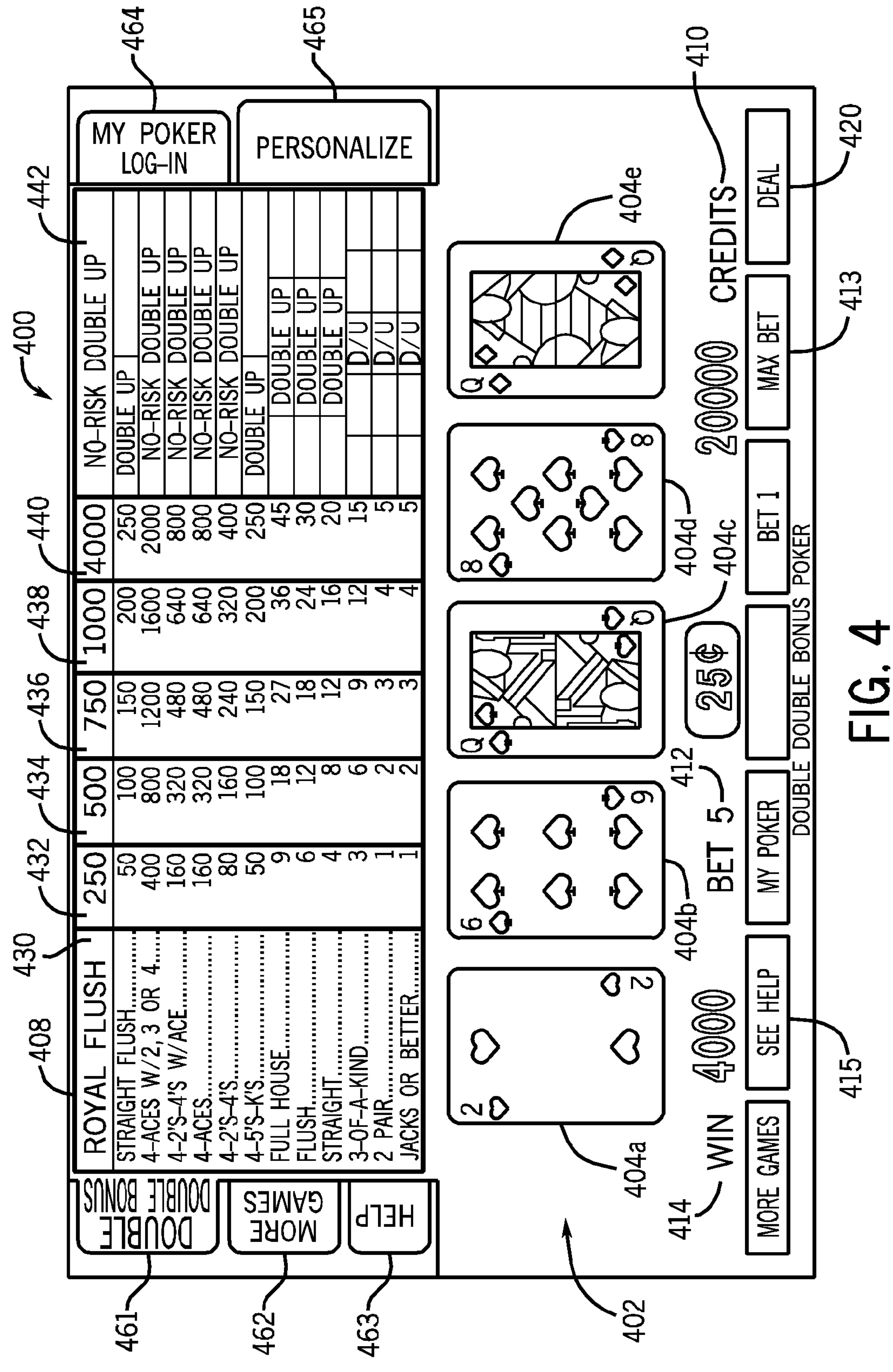
FIG. 4 is an image from the embodiment shown in FIG. 3 showing a basic game screen after a poker hand is dealt.

FIG. 4 shows a poker-themed game image 400 featuring a basic wagering game such as a five-card draw poker game—Double Double Bonus Poker in this example—which may be displayed on the primary display area 14. In the illustrated example, the image 400 of the basic poker-game displays a playable hand 402 composed of a plurality of cards 404*a-e*. The basic poker-game image 400 also displays a paytable 408, game-session meters, and various buttons selectable by a player. In a five-card draw-poker game, five cards are displayed face-up to a player to form a first playable hand once the wager is accepted and the player selects the deal button. The player is able to select none, one, or a plurality of the cards 404*a-e* in the playable hand to hold. However, the player generally will hold any winning cards (e.g., either card 404*c* or card 404*e* because they form a pair of queens, which form a hand specified in the paytable 408). In this example, if the first playable hand were to form a five-card straight or flush, full house, etc., and the player held all five of the dealt cards, the player would be awarded a payout and the gaming session would end. However, where one or more of the cards are not selected to be held, the non-selected card or cards may then be replaced to form a second playable hand—which in some examples is also the final playable hand.

The game-session meters include: a "Credits" meter 410 for displaying a number of credits available for play on the machine; a "Bet" meter 412 for displaying a number of credits wagered (e.g., from 1 to 5 credits); and a "Win" meter 414 for displaying an amount to be awarded based on the results of the particular round's outcome. The player-selectable buttons can also include a "Collect" button to cash out the credits remaining on the credits meter 410, a "Help" button 415 for viewing instructions on how to play the video poker game, and a "Max Bet" button 413 for wagering a maximum number of credits (e.g., 5 credits). The wagering game is initiated after a wager is made by a "Deal" button 420 for causing the game to initially deal cards face-up from a deck into the playable hand 402.

The paytable 408, shown on the primary display area 14, may also or alternatively be displayed on the secondary display area 16 in FIG. 1. The paytable 408 includes a column listing winning-poker-hand rankings 430 and a plurality of payout columns 432, 434, 436, 438, and 440 with payouts associated with each ranking. The list of winning poker-hand-rankings 430 includes predetermined non-monetary criteria, which in this example are standard poker-hand rankings beginning at a pair of jacks or better and includes hands through a royal flush. The number of credits won is linearly proportional to the number of credits wagered, except that a royal flush typically yields a bonus when achieved on a maximum wager. In this example, the payout columns 432, 434, 436, and 438 list credits that are paid for 1, 2, 3, and 4 credits respectively. The maximum wager payouts for a basic wager of 5 credits are listed in column 440. The basic wagering game shown in FIG. 4 includes a bonus feature—in this case No-Risk Double Up Poker—that allows a player greater awards. A bonus feature field 442 for the No-Risk Double Up feature is included in this example.

The video poker game can include bonus features that can be applied to any of the abovementioned basic games. The bonus features can modify the paytable of the basic games by adding additional payout columns 442 for the bonus features, and can add new features such as extra bonus pays for certain hands, free play, opportunities to double the original bet, repays of prior hand winnings, and various other schemes that can increase the probability of winning hand or increase the amount of the award associated with the ranking of a winning hand. Some bonus features require additional credits added to the original wager.

Bonus features in the video poker game can include but are not limited to:

- Standard Poker—The Standard Poker feature plays the selected basic game with no enhancements.
- Bonus Royals—The Bonus Royals feature adds a bonus payoff to Royal Flush hands.
- No-Risk Double Up—For a 5-credit additional buy-in, a winning hand enables the option to pick cards for up to a 16× multiplier without risking the initial winning payoff.
- Free Play Poker—For a 1 or 2 credit buy-in, the player gets a chance for a free play at 1× or 2× with each winning hand, a free plays continue during a winning streak up to 100 free hands.
- Win-It-Again Poker—With a 3 credit buy-in, any winning hand re-pays the awards from the previous five hands.

The abovementioned bonus features can be augmented by additional features, and they can be modified from the descriptions provided herein.

Figure 5:
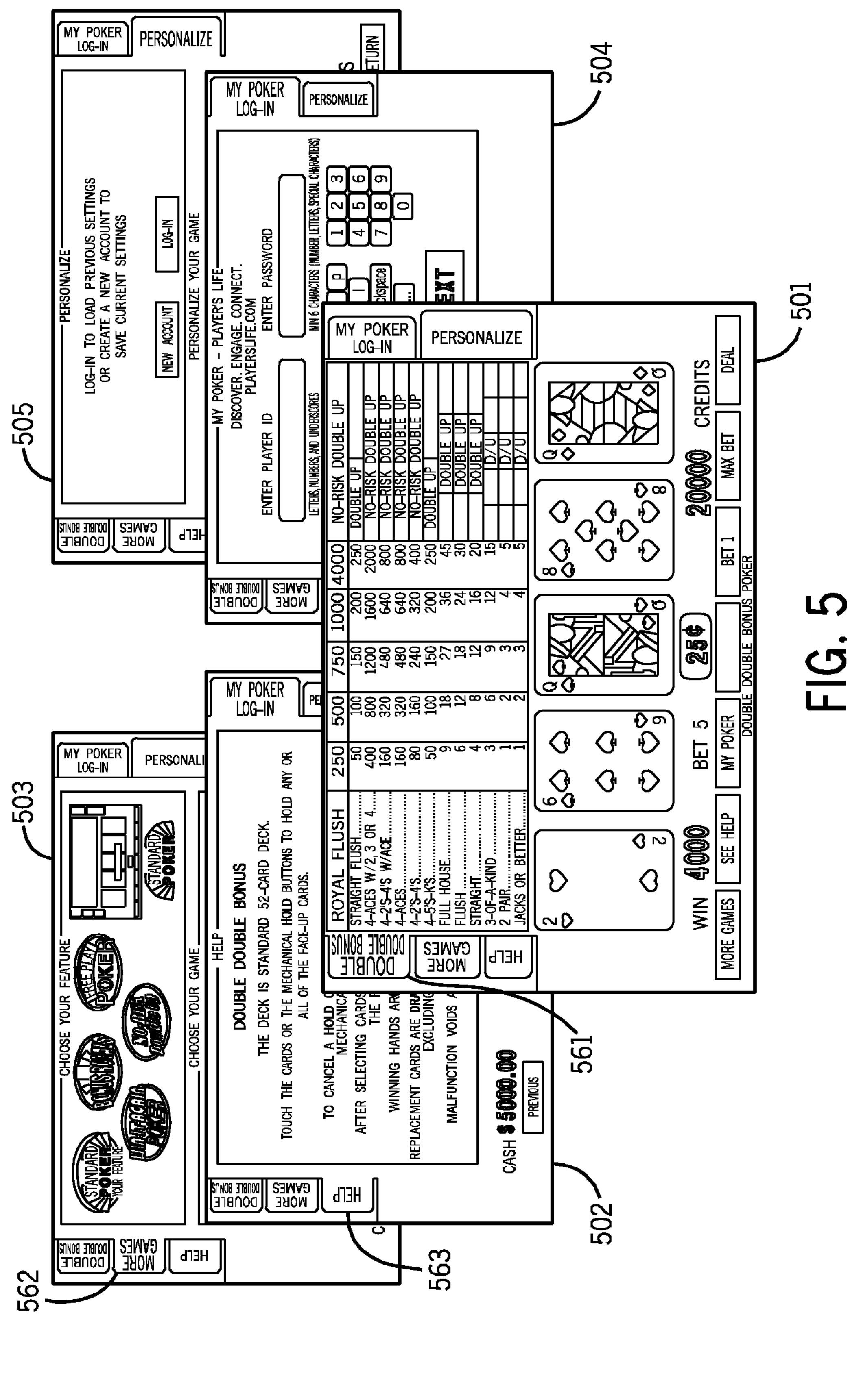
FIG. 5 is an image from the embodiment shown in FIG. 3 showing the various screens summoned by screen tabs.

An embodiment of the video poker game includes tabbed browsing to simplify and speed-up switching between various game-play and game-related screens while the game is played. As seen in FIG. 4, selectable tabs 461-465 are displayed on multiple screens related to the video poker game. FIG. 5 shows exemplary screens 501-505 that can be summoned by the picking the various tabs. The following examples are provided for illustration purposes and it is understood that an embodiment of the invention can comprise different and additional tabs and that the exemplary screens can vary from those shown herein.

The tabs enable the player to transition quickly between various pages and menus by simply touching on, or otherwise selecting, a tab. For example, the "Current Game" tab 561, in this embodiment showing "Double Double Bonus", will bring up the Current Game screen 501 showing the paytable, cards, denomination, and other relevant game information related to the currently selected game. The "Help" tab 563 calls up the Help screen 502 related to the currently selected game. The "More Games" tab 562 recalls the introductory screen 503 so that the player can choose a new feature, new game, or different denomination.

Figure 6:
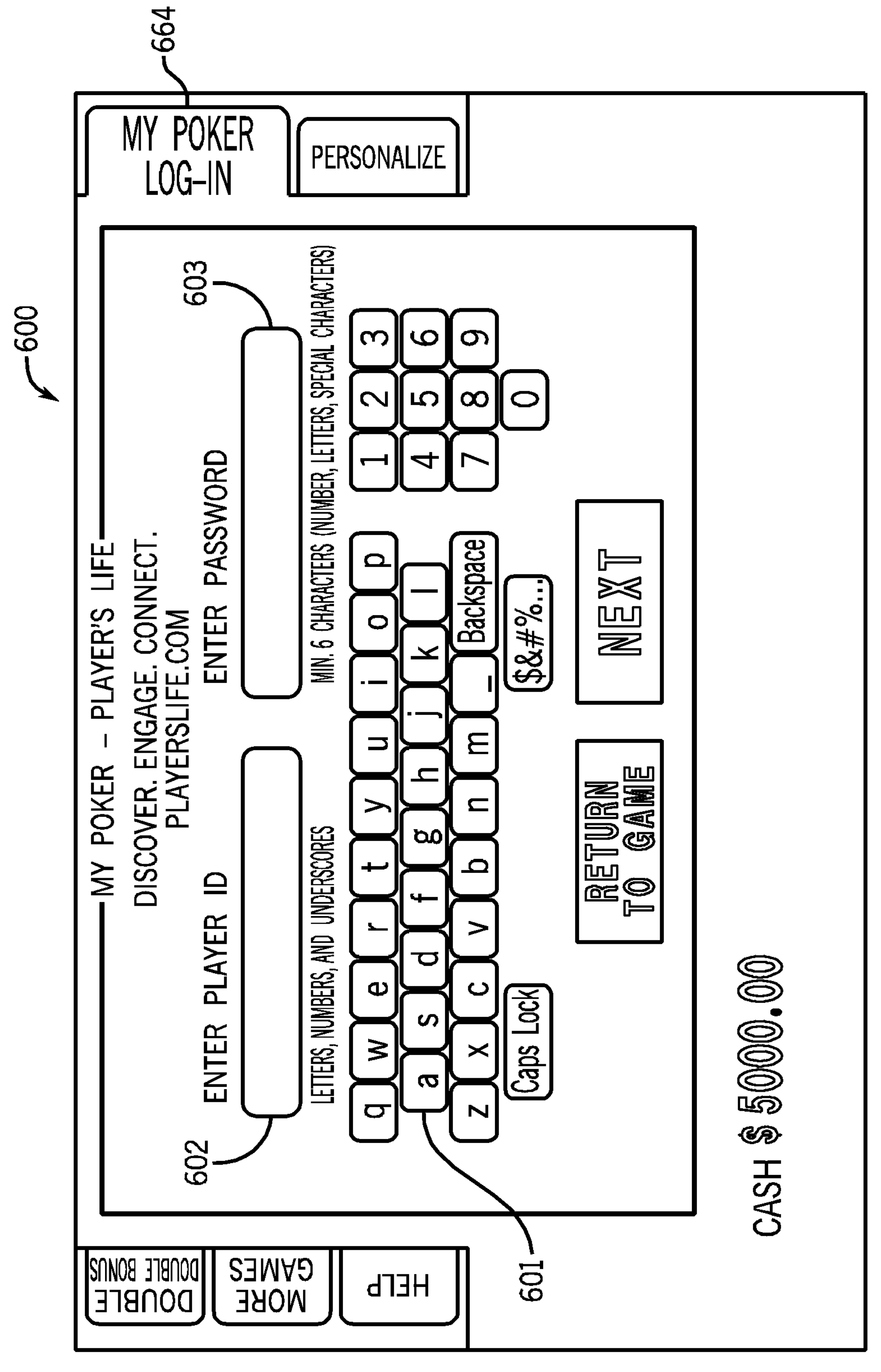
FIG. 6 is an image of the embodiment shown in FIG. 3 showing the log-in screen for connecting to a player account.

Referring now to FIG. 6, the "My Poker Log-in" tab 664 displays the player's Life™ log-in screen 600, for logging in to a player account associated with a gaming community, a gaming website, a social networking site, on a game server, and in various memory storage sites, via a communications network. The player account can be used to restrict access to game data and information to only those players authorized to access the account. The player's Life™ log-in screen 600 includes a touch screen keyboard 601 that can be used to enter symbols in a player ID field 602 and a password field 603. The player can create a new player account and can log-in to an existing player account from the log-in screen.

The video poker game takes advantage of many features and functions available via on-line gaming communities, social networks, gaming websites etc. Once logged-in, the player can access features such as unlockable game content, special games and game-related activities, enhanced customization features, and various other offerings that can be accessed on-line via a game server, from the gaming terminal within the land-based gaming establishment and from a remote device (e.g., a personal computer, tablet, mobile phone, or other Internet-connected device) outside the gaming establishment.

It can be useful to facilitate asymmetry between the access capabilities of the remote device and the gaming terminal. So, for example, in one embodiment, a player might log-in to a gaming website from the remote device, accrue some special features related to game play, and then store the special features in their player account. These special features cannot be accrued from the gaming terminal, even if the player logs in to their player account. Once accrued, however, the special features can be downloaded to the gaming terminal by logging in to the player account, and then applied during game play at the gaming terminal. In this fashion the player is encouraged to utilize both the gaming website, using the remote device to access the site and to accrue special features, and the gaming terminal, to download the special features and use them while playing the wagering game at the terminal. Similarly, a player could log into their player account via the remote device to access an enhanced set of customization features, in order to select and modify some of the features according to personal preference, and then save the selected features in their player account. A player logging in from the gaming terminal would not have access to the enhanced set of features for the purpose of selecting and modifying the features, but the enhanced features saved in their player account could be downloaded and applied while playing the wagering game at the terminal. A person having ordinary skill in the art (PHOSITA) can envision other examples of asymmetric capabilities of the remote device and the gaming terminal that could enhance the players gaming experience and encourage players to use both the gaming website and the gaming terminal to fully implement all the game features.

Figure 7:
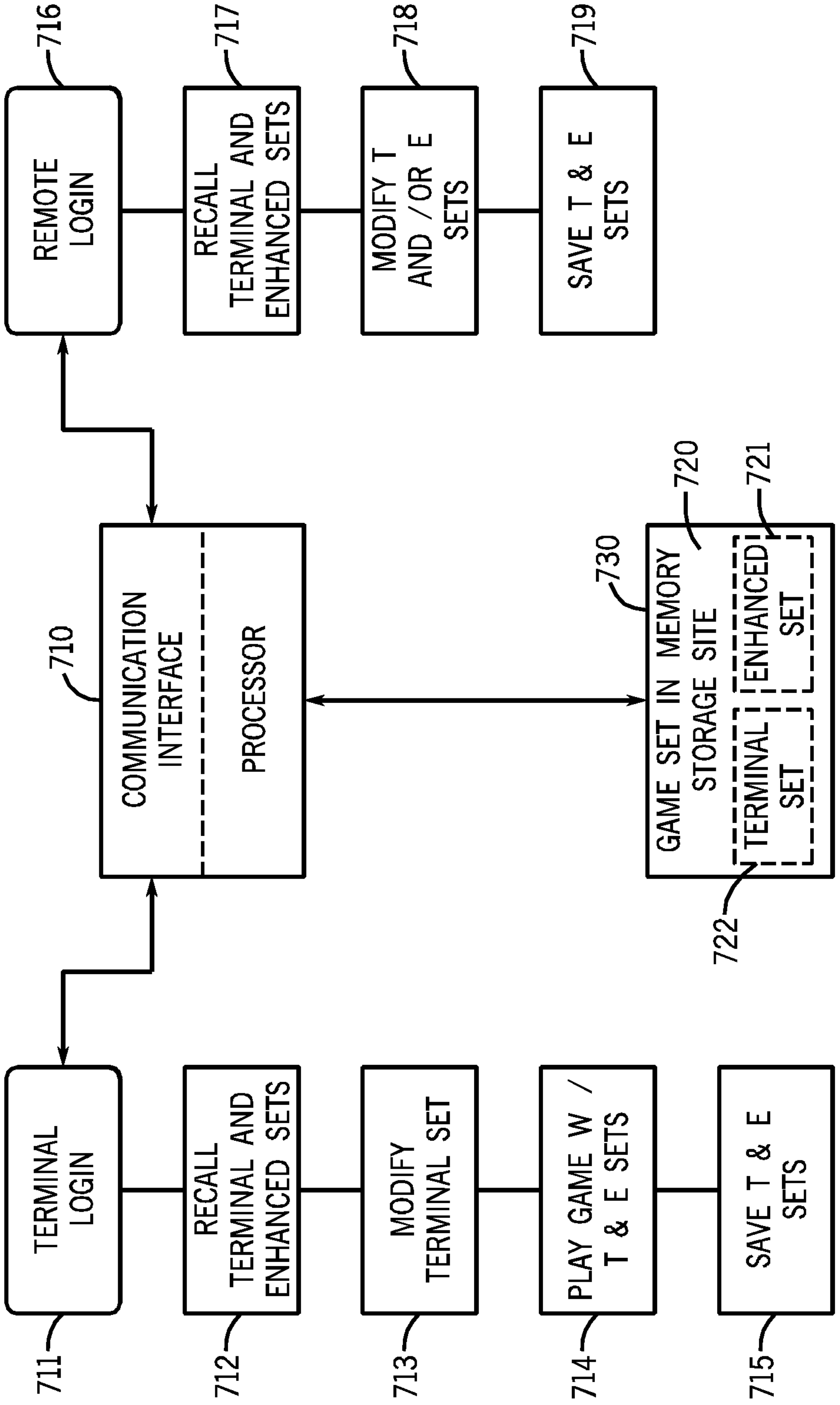
FIG. 7 is a schematic view of a gaming system having asymmetric personalization capabilities according to an embodiment of the invention.

FIG. 7 demonstrates an embodiment of the invention that utilizes asymmetric customization capabilities, depending on whether the player is at a gaming terminal, for example on a casino floor, or at a remote device such as a personal computer and connected to a communications network. In this embodiment, asymmetry is used in determining access to the full set of customization features provided to the player, so that only some of the features are available for modification from the gaming terminal but all features are available from the remote device. Asymmetric access to the customization features from the gaming terminal and the remote device can be useful to encourage players to visit the gaming website or social networking site, and also to limit the time players spend customizing at the gaming terminal rather than playing the game.

The video poker game provides a plurality of selectable game-play features for customization, both at the gaming terminal and via a remote device. However, not all features can be modified by a player at the gaming terminal. Here and throughout, the full set of customization features available in the video poker game will be referred to as the game set 720, the features available for modification at the gaming terminal will be referred to as a terminal set 722, and the remaining game set features that are not members of the terminal set will be referred to as an enhanced set 721. In this embodiment, only the terminal set 722 of features can be modified by a player at the gaming terminal. The entire game set 720 (terminal set plus enhanced set) is available for modifying via the remote device. The entire game set 720, it should be further noted, is available for playing, but not modifying, at the gaming terminal.

In an embodiment of the video poker game, a full set of customization features resides in a memory storage site that can be accessed via a game system 710 having a processor and a communication interface. To illustrate the asymmetric customization capability of the video poker game, consider a player logging in 711 to the gaming system 710 from a gaming terminal. The player can recall 712 a game set 720 of features from a memory storage site 730. The game set 720 can be a default game set and can be a previously-saved game set. The player at the gaming terminal can optionally modify 713 some of the features—the terminal set 722 of features—included in the game set, but not other features—the enhanced set 721. While the game set (both default and saved) includes the full set of game-play features, the player at the terminal can only modify (customize) those features that are included in the terminal set subset of the game set. All of the features—both the terminal set 722 and the enhanced set 721—will be applied when the game is played 714, but only the terminal set 722 can be modified from its recalled state by the player at the gaming terminal. After playing the game 714, the player can choose to save 715 the applied game set—again including both the terminal set and the enhanced set—in the memory storage site 730.

Continuing the illustration of the embodiment, a player logging in 716 from the remote device can recall 717 the game set 720 of features from the memory storage site 730, and can modify 718 the entire game set 720, including features from terminal set 722 and from the enhanced set 721. Also, the player at the remote device can save 719 the game set 720, including any modifications to the terminal set 722 and the enhanced set 721, in the memory storage site 730. The game set that is modified and saved from the remote device can be applied, including all features in the terminal set and the enhanced set, while playing the game at the gaming terminal.

Figure 8:
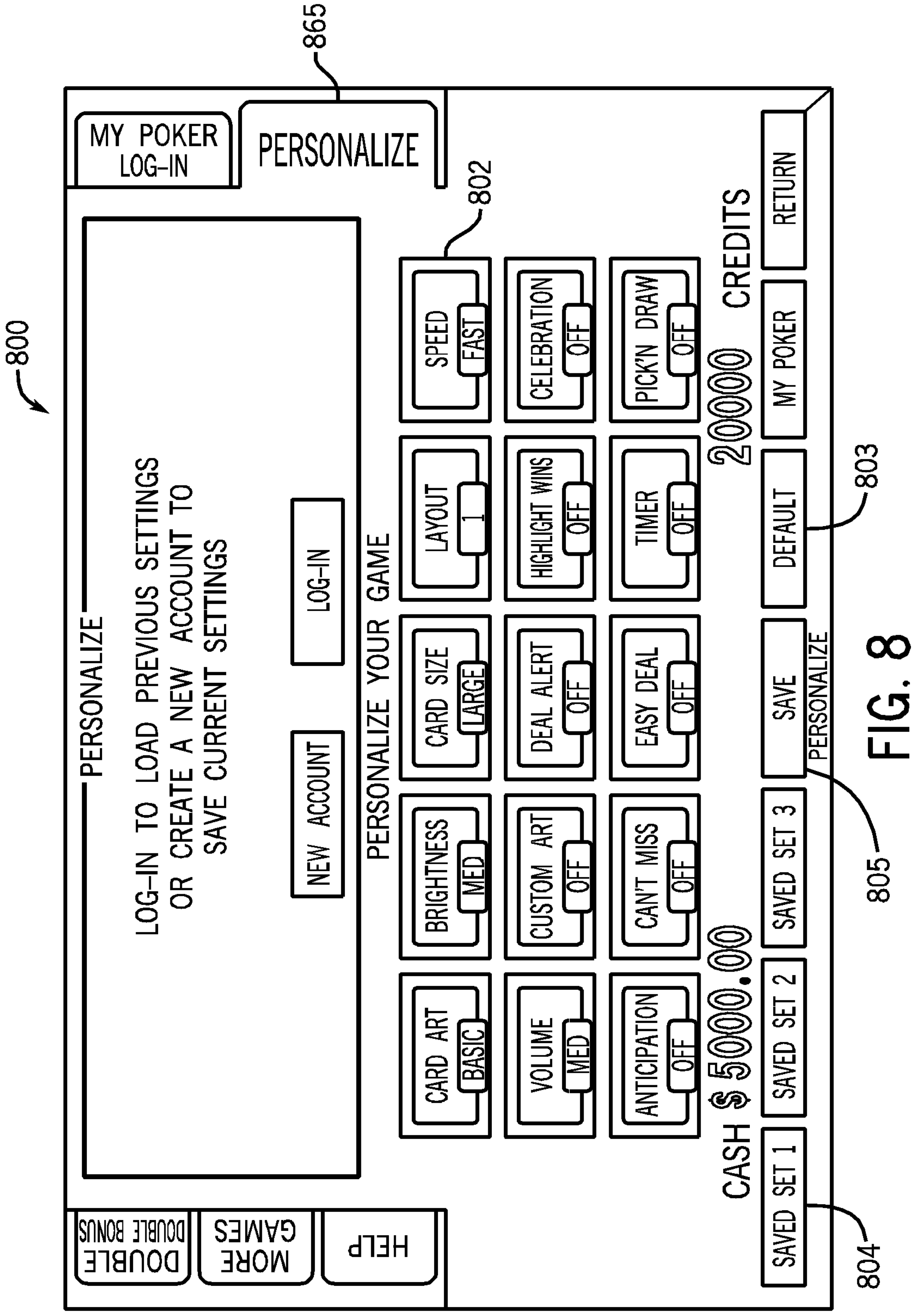
FIG. 8 is an image of the embodiment shown in FIG. 3 showing the personalization selection screen.

Referring now to FIG. 8, the "Personalize" tab 865 opens the customization screen 800, where a player can select from a plurality of selectable game-play features 802 that can be modified to adapt game play according to a player's personal preferences. The selectable game-play features listed below can be included in either the terminal set or in the enhanced set, depending on decisions by a system administrator such as the casino operator, the game manufacturer, or other authority. Features can be restricted by graying-out the selection buttons, by hiding the selection buttons, by graying-out selections on a drop-down menu, and by providing different menus depending on whether the player logs in from the remote device or from the gaming terminal. Other methods and modes for restricting features can be easily envisioned by PHOSITA while still exemplifying the broad principles of the invention.

Some of the customization features included with the video poker game can be:

Card Art—Allows players to choose their card art, both front and back. Selections can be made from a library of preset options, such as Fancy and Big Pips, as well as themed decks (i.e. Pirate Deck, Western Deck, etc.) "Build-your-own" decks can be created using player-supplied art and images.

Brightness—Allows players to adjust the brightness of the screen.

Card Size—Allows players to adjust the size of the cards displayed on the screen.

Layout—Allows players to choose the layout of the screen including Card position, Pay Table position, Meter positions, and Buttons (on/off and position.) Players can choose from preset layouts and can create their own layouts.

Easy Deal—Allows players to choose the order in which cards are dealt, for example, Low to High, High to Low, and By Suit. Players can select from a menu of preset deal orders. Easy Deal can order dealt cards so that the player can quickly identify winning combinations and partial combinations, and so assist the player in selecting cards to discard and to hold. Some embodiments of Easy Deal can include a "layering" option. Layering refers to the ability to choose multiple options and their order. For example: The player may choose 'By Suit' as their primary Easy Deal option, then 'High to Low as their secondary option. The cards will be dealt by order of suit first, then high to low within each suit.

Figure 9:
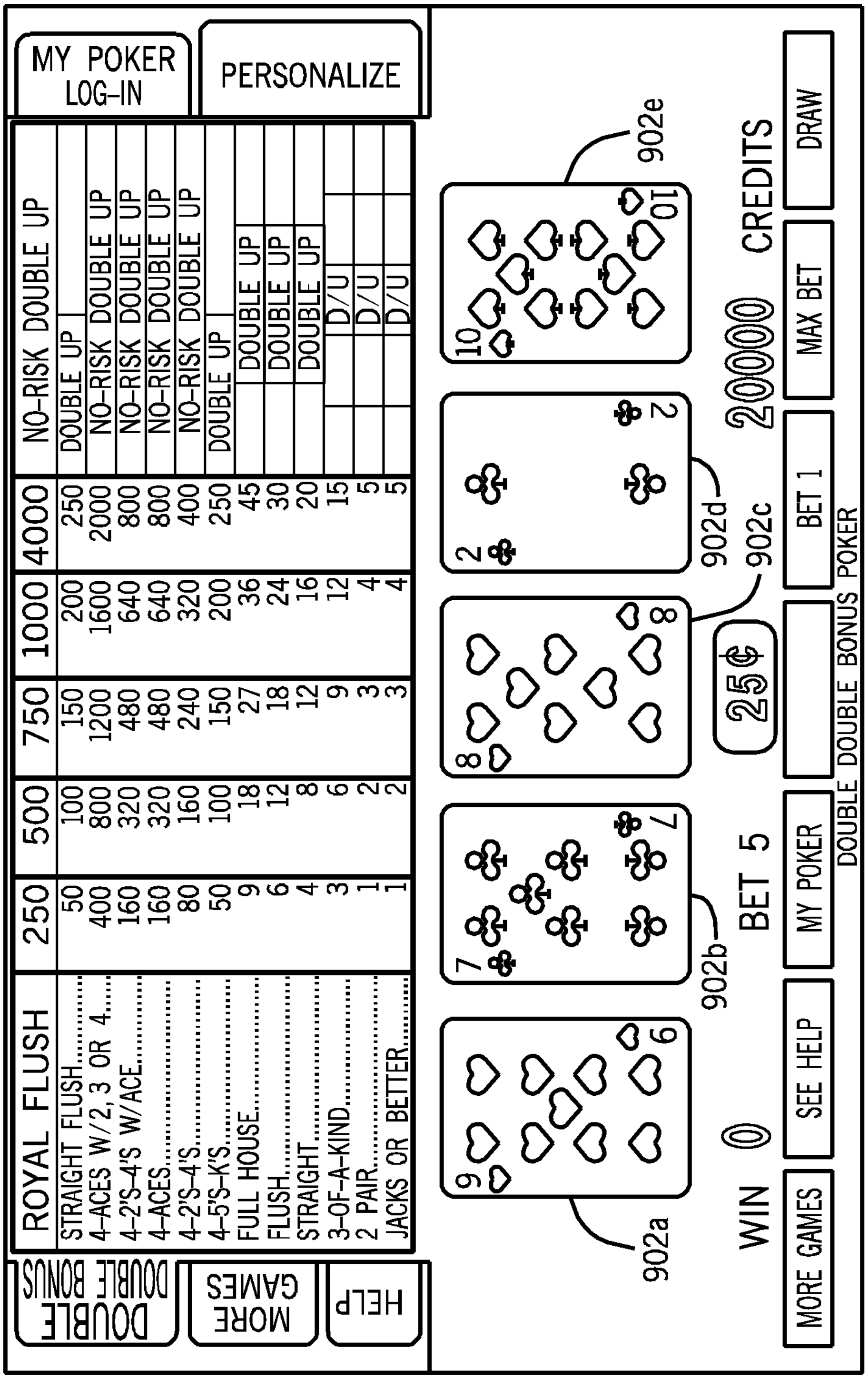
FIG. 9 is an image of a randomly ordered dealt hand in an embodiment of a video poker game.
Figure 10:
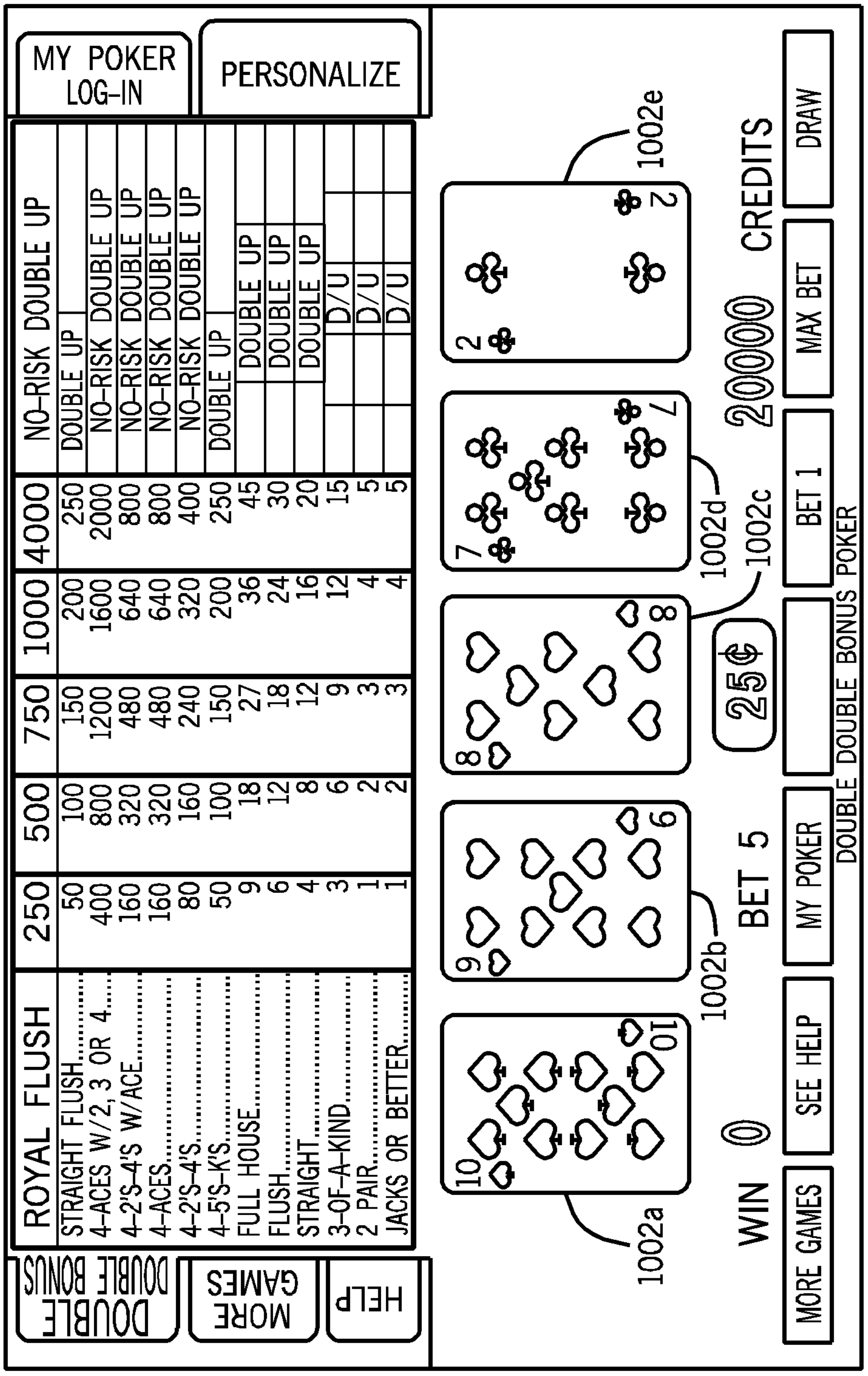
FIG. 10 is an image of the dealt hand of FIG. 9, ordered by an embodiment of Easy Deal by Suit and from High-to-Low.

To help illustrate an embodiment of the Easy Deal customization feature, FIG. 9 shows a dealt hand 902*a-e* in random order. In contrast, FIG. 10 shows a dealt hand 1002*a-e* ordered by Easy Deal so that same suit cards are grouped together and ranked from high to low. It is evident from these figures that Easy Deal can help the player identify possible combinations, in this case a potential straight that might be missed without the Easy Deal feature. Regardless of the Easy Deal feature selected, the player still has the option of discarding some or all of the dealt cards.

Easy Deal options can be utilized to tailor the ordering of dealt hands to a particular poker variation and to a particular bonus feature. For example, if the poker game pays higher awards for four 2's than other four-of-a-kind hands, the player can choose to be alerted when a pair of 2's or three 2's are dealt.

Figure 11:
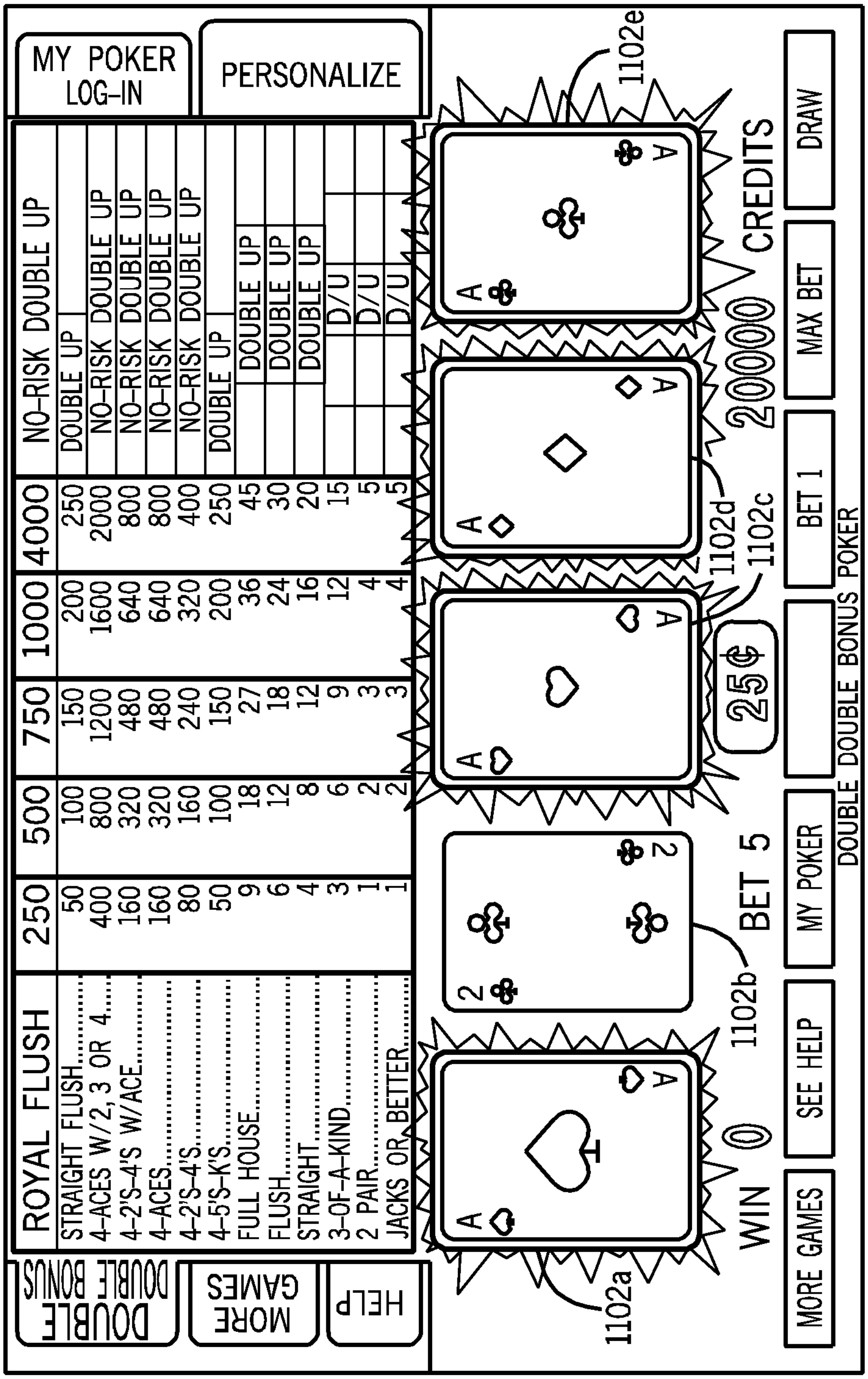
FIG. 11 is an image of a traditional 4-of-a-kind dealt hand highlighted by an embodiment of Deal Alert.

Deal Alert—Highlights winning dealt cards by flashing the cards found in any winning combination. Players can select from preset combinations and can individually select which winning combinations are flashed. Also, players can select non-winning combinations for flashing, such as "lucky" cards and combinations. For example, a particular player may favor drawing to a flush. The player could choose to be alerted on being dealt four cards of the same suit but not on four cards in a possible straight. An embodiment of Deal Alert highlighting is shown in FIG. 11 and in FIG. 12. FIG. 11 shows a dealt hand 1102*a-e* including four Aces. Four Aces is traditionally a winning hand and is included in the paytable shown in FIG. 11 as "4-Aces's". In an embodiment of Deal Alert, the four Aces are highlighted, after the deal and before the draw, to indicate a potential winning combination. The player is alerted to the potential winning combination but still has the option to discard some or all of the dealt cards.

Figure 12:
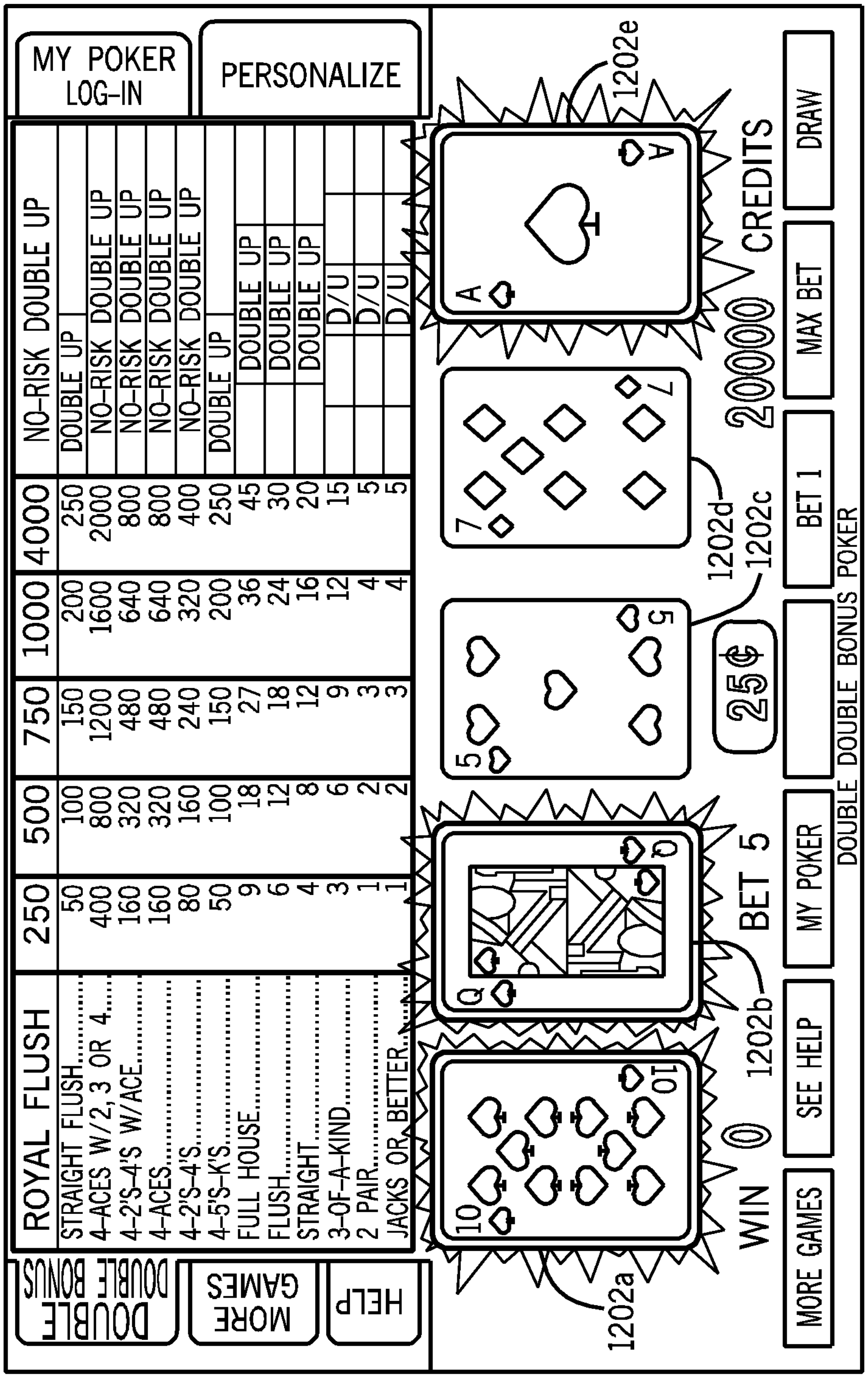
FIG. 12 is an image of a non-traditional 3-to-a-Royal dealt hand highlighted by an embodiment of Deal Alert.

FIG. 12 shows a dealt hand 1202*a-e* highlighting an A-Q-10 of clubs, which could build up to a Royal Flush if the player draws the King and Jack of clubs. An embodiment of Deal Alert can enable the player to highlight even a non-traditional combination such as 3-to-a-Royal, and the player in this case has selected the Deal Alert option to highlight a 3-to-a-Royal combination even though the dealt cards do not make a complete winning hand. Various other combinations can be selected by the player for highlighting. As in the previous example, the player can choose to discard any or all of the dealt cards regardless of the Deal Alert selection.

Highlight Wins—Highlights winning hands after the draw and darkens losing cards. Players can opt to turn Highlight Wins on and off, and can change the type of highlighting, for example; Raise Winners, Scale Winners, Animate Winners etc.

Celebration—Plays celebration animation for certain winning combinations. Players can turn Celebration on and off, choose the type of animation, and can individually select the combinations that are celebrated. Also, players can set thresholds for Celebration, for example, at least a 50× multiplier or any winning combination. Threshold selection enables a player to choose which winning combinations are celebrated regardless of the current game and the current game table. For example, if Jacks-or-Better pays less than a maximum bet, the player can elect to skip celebrations for Jacks-or-Better hands and celebrate only higher paying hands. Similarly, the player may consider four Queens to be a "lucky" hand and skip celebrations for all but hands showing four Queens.

Anticipation—Slowly reveals cards in near-win situations. When Anticipation is on, certain draw scenarios are accompanied by a "slow reveal" of the drawn cards. For example, if the held cards include two Aces, the drawn cards can be "slow revealed" in anticipation of a third Ace. Players can individually select which combinations trigger the slow reveal and can choose between different types of slow reveal schemes. Types of reveal schemes can include simple animation effects such as fade-ins, suits first, and ranks first. As with the Easy Deal and Deal Alert features, the Anticipation features can include various levels of customization, including non-traditional combinations and thresholds to trigger a slow reveal scheme.

Figure 13:
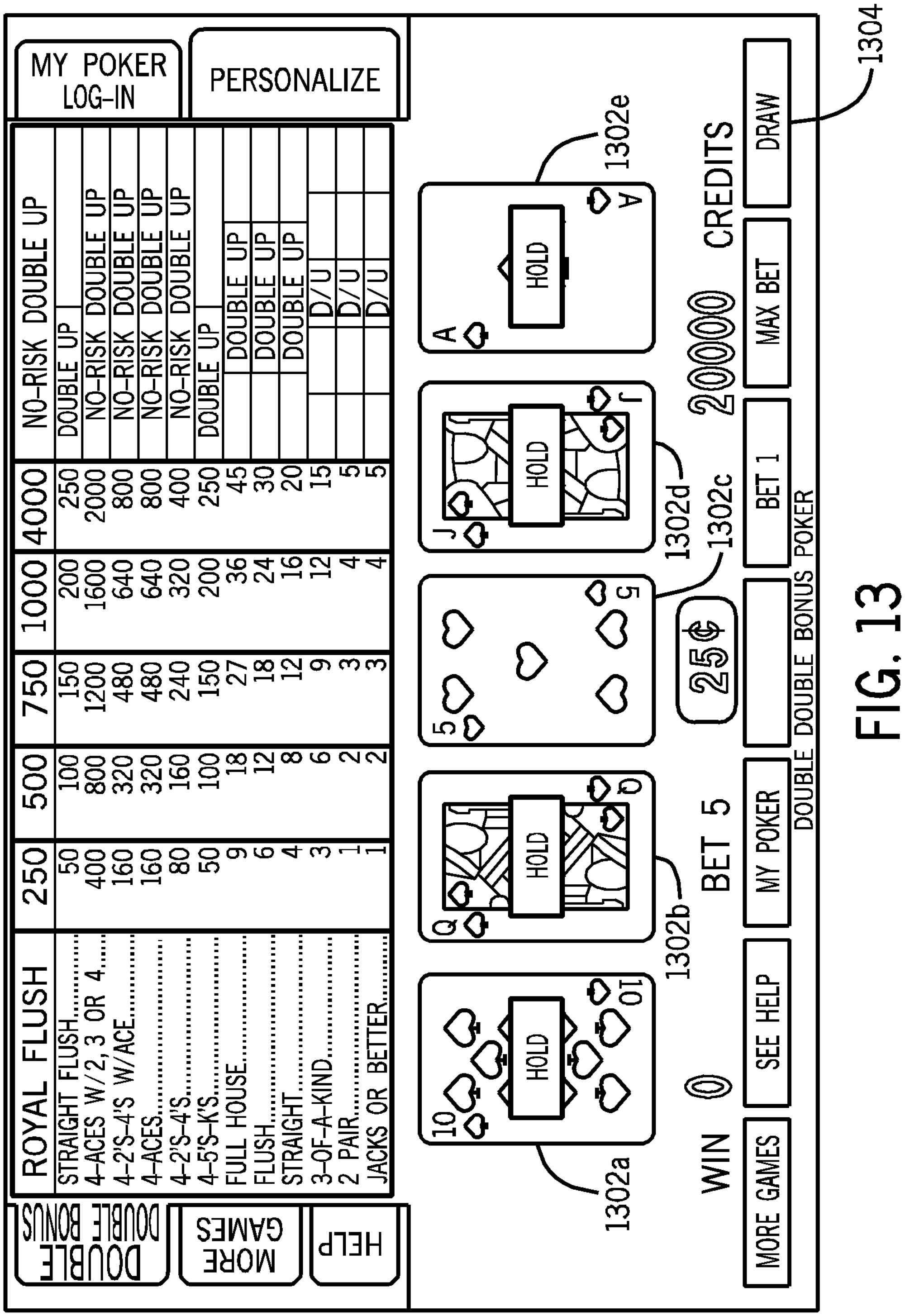
FIG. 13 is an image of a dealt hand with cards selected for holding and one card to be discarded.
Figure 14:
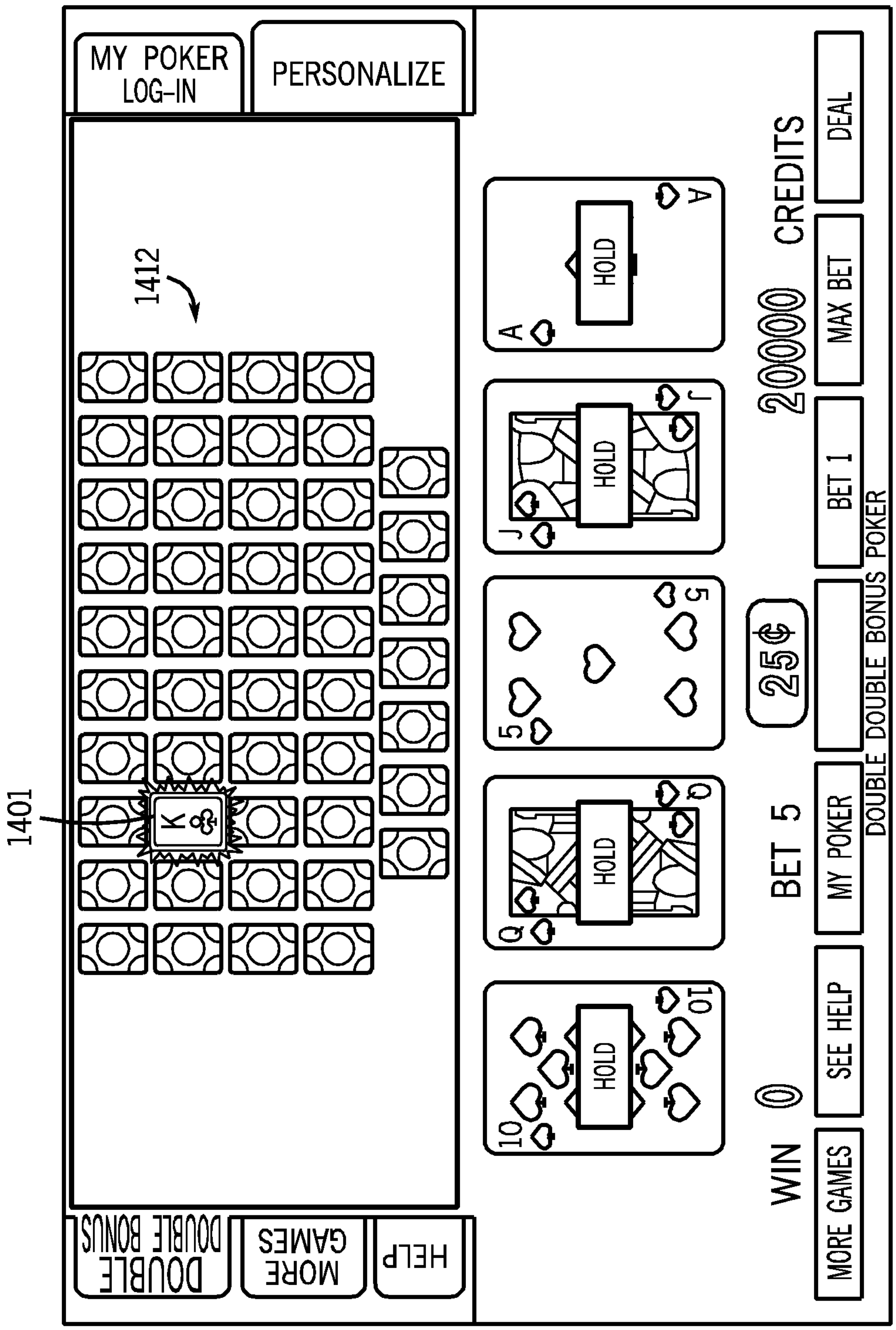
FIG. 14 is an image of an embodiment of an interactive reveal scheme showing a pick field after a player selects a card to replace the discarded card from FIG. 13.
Figure 15:
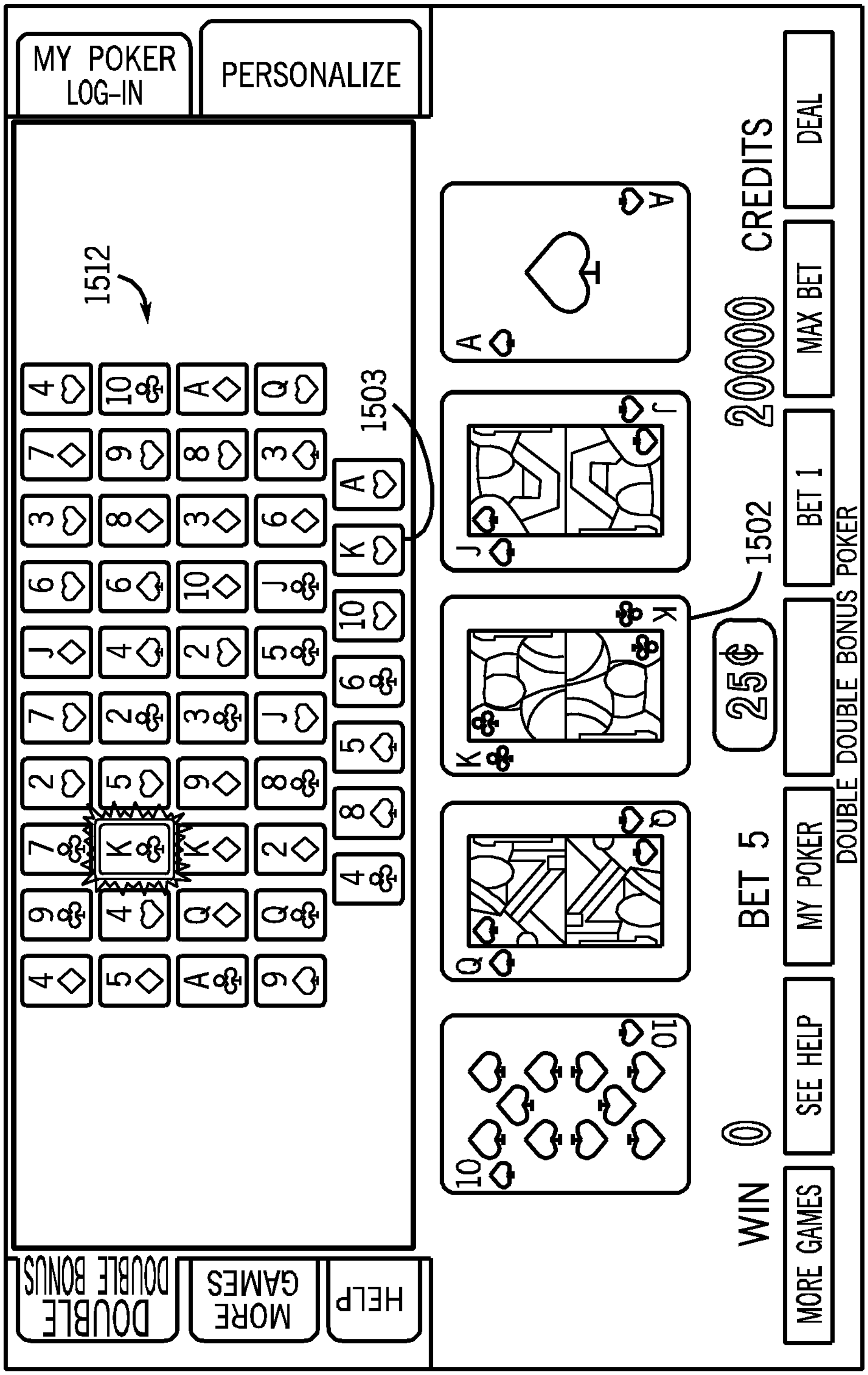
FIG. 15 is an image of the pick field of FIG. 14 after the remaining unpicked cards are revealed and the drawn card is added to the dealt hand.

Some embodiments of the video poker game can include interactive reveal schemes, where the player selects cards for drawing from a random selection of potential drawn cards. FIGS. 13-15 illustrate one embodiment of an interactive reveal scheme. In FIG. 13, a dealt hand 1302*a-e* including 4-to-a-Royal Flush in Spades is displayed via the gaming terminal 10. The hand shows the player has elected to hold the four spades and discard the 5 of Hearts 1302*c*. When the player hits the DRAW button 1304 (in this case a soft button displayed on the screen), the screen switches to a pick field screen shown in FIG. 14. The pick field displays the original dealt hand at the bottom of the screen, and the remaining 47 cards 1412 from a standard 52-card deck are shown face down at the top of the screen. In the illustrated embodiment, player selects drawn cards from the 47 cards 1412 by touching a touch screen over the selected cards, although there are various methods and means for detecting player selections via a player input device. In FIG. 14, the player has selected a drawn card 1401 in the pick field, and the drawn card 1401 (the King of Clubs) is shown face up and highlighted.

FIG. 15 illustrates the embodiment after all drawn cards have been selected and shown face up. All the remaining unpicked cards 1512 are revealed to the player, including the sought-after King of Spades 1503. The drawn card 1502 is added to the dealt hand which, in this example, does not form a winning combination. Interactive reveal schemes detect and respond to player inputs in such a way as to enable the player to influence the game outcome.

Figure 16:
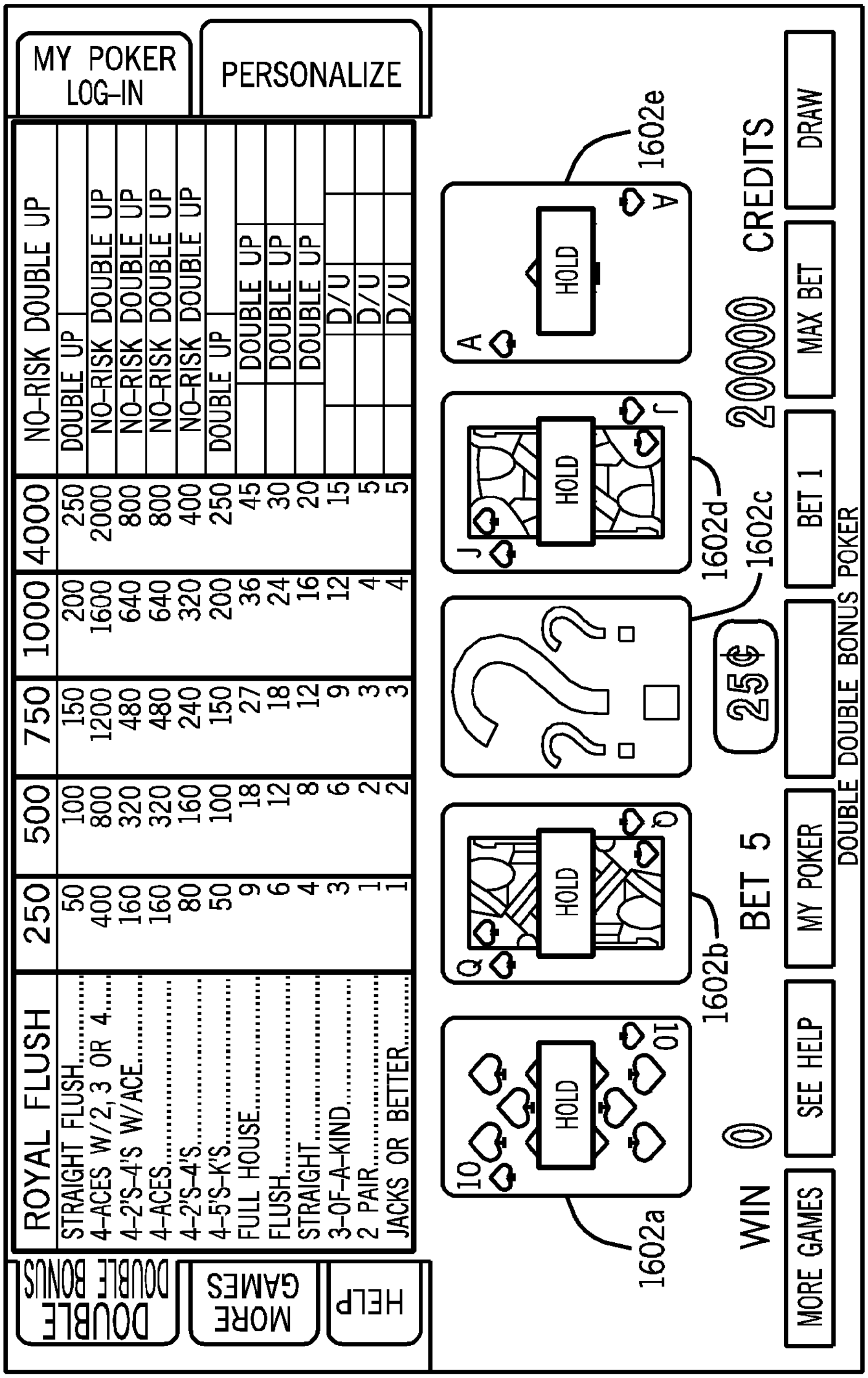
FIG. 16 is an image of an embodiment of a pseudo-interactive "Scratch-off" reveal scheme showing the drawn card hidden by a mystery card.
Figure 17:
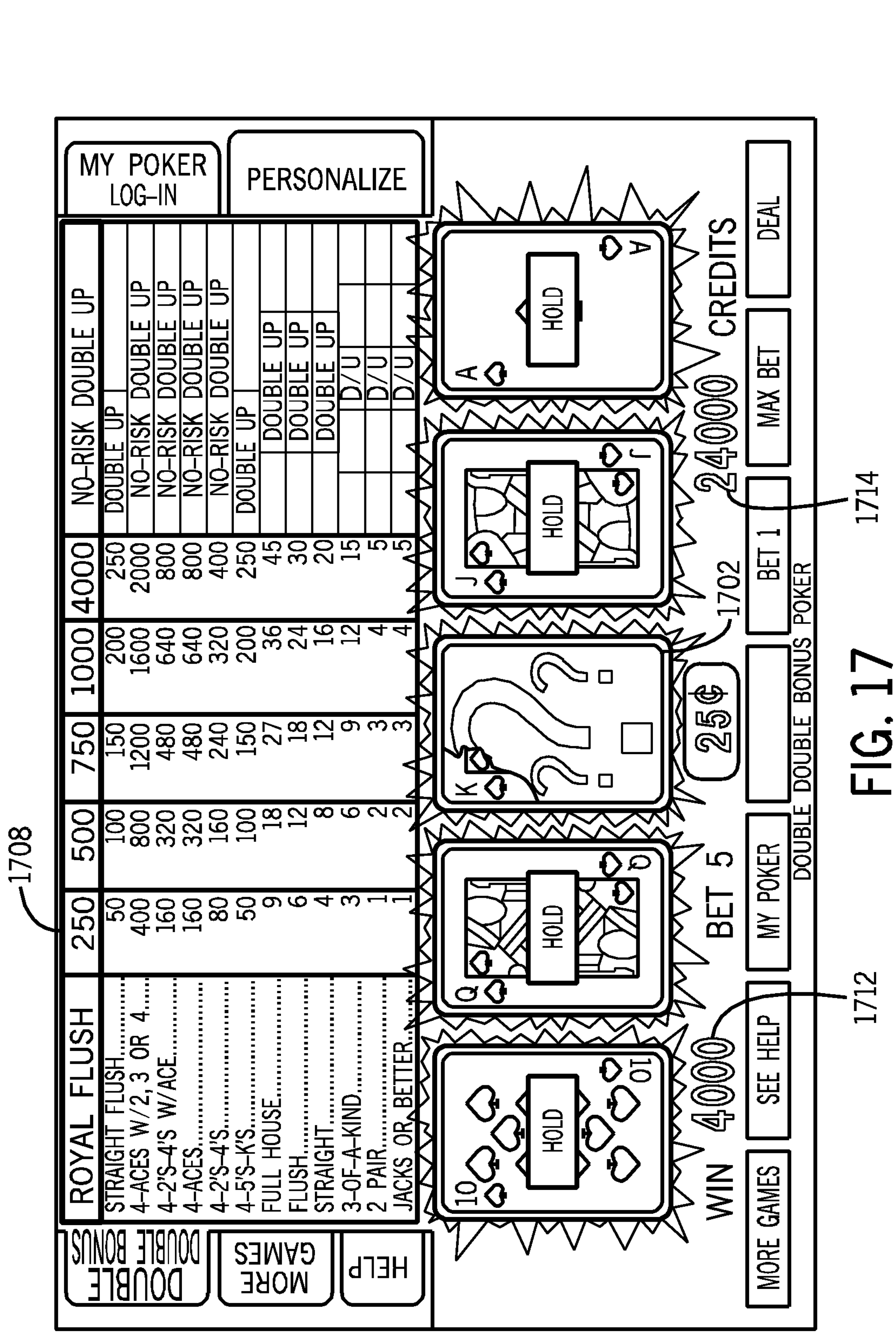
FIG. 17 is an image of the "Scratch-off" reveal scheme of FIG. 16 after the mystery card is partially "scratched-off" to reveal the drawn card.

As illustrated in FIGS. 16-17, pseudo-interactive reveal schemes can be utilized to generate extra interest in the gameplay. In a pseudo-interactive reveal scheme, drawn cards are randomly selected for the player, and player input is required to reveal the randomly selected drawn cards. For example, FIG. 16 shows the same dealt hand 1602*a-e* from FIG. 13, including the 4-to-a-Royal Flush in Spades. The player has selected the four Spades for holding and the last card 1602*c* has been drawn and is displayed as a mystery card to hide its suit and rank.

In FIG. 17, the player has "scratched-off" a corner of the mystery card 1702 by rubbing the touch screen over the card, to reveal the King of Spades and complete the Royal Flush. The cards in the Royal Flush are highlighted, the paytable 1708 is highlighted to show the payoff, and the Win meter 1712 and the Credit meter 1714 both indicate the 4000 award associated with the Royal Flush.

While the player's input in the pseudo-interactive reveal scheme does not affect the game outcome, the pseudo-interactive scheme can generate enthusiasm and help to engage the player's interest in a particular game.

Can't Miss—Alerts when an obvious mistake is made relative to computer-programmed optimum play. "Can't Miss" alerts players when they choose to discard dealt cards that are usually held. For example, if a player is dealt three Kings and elects to discard one of the Kings, the player is alerted to the presence of the three Kings before the discard, allowing the player to reconsider their choices. In some embodiments of the video poker game, players can turn Can't Miss on and off, and can choose from preset alert combinations. Also, in an embodiment, players can individually select combinations to create new alert combinations and can select the order of importance of alert combinations.

Speed—Adjusts the speed of dealt and drawn cards. Players can select options to control the "global speed" of all game scenarios, and can adjust the speed of specific game scenarios such as Draw Speed, Deal Speed etc. There can also be an option for "Instant" play of scenarios.

Speed Timer—Allows players to see their average and current speed of play, including hands per hour (Current/Average) and hands per minute (Current/Average.) Players can select on and off, and can save sessions statistics in a memory storage site. After saving to memory, players can access statistics in various formats, for example, a player may view their hands per hour average over their entire lifetime, or only during the last gaming session. Another embodiment would allow a player to view winning hands from previous gaming sessions.

An embodiment of the Speed Timer feature can be implemented in conjunction with a player account associated with a gaming community, gaming website, social networking site, etc. The historical data related to the player's speed can be directed to a memory storage site associated with the player's individual player account each time the player initiates a gaming session, so that speed time statistics for gaming sessions are cumulative over time. An additional option in some embodiments enables the player to store past winning hands in the memory storage site and recall the hands for viewing at a later date. The player has the opportunity to re-live big wins and lucky streaks from past gaming sessions, which can increase player enthusiasm and loyalty.

Screen Art—Customized screen graphics. Players can customize their on-screen graphics, including colors and themes. Players can select from preset graphics schemes and can create their own schemes by selecting from a library of tools and art.

Volume—Adjusts the game volume. Players can select options to control the "global volume" used during game play, and can adjust the volume of specific game sounds such as Deal Sound, Winning Hand Sound, Bang-up Sound etc.

The aforementioned features and feature options should not be considered an exhaustive listing of possible features, and additions and variations will be evident to those PHOSITA. These inventive and novel features and feature options demonstrate the broad aspects of the invention that will also encompass those alternate embodiments that incorporate to the principles presented herein.

As previously mentioned, selectable game-play features can be included in the terminal set and in the enhanced set, the inclusion affecting primarily the means of accessing and modifying the features. Also, customized game sets can be saved, both from the gaming terminal and the remote device, in a memory storage location such as a player account on a game server. Game sets stored in a player account can be accessed by authorized players and can be modified in accordance with the access capabilities (symmetric, asymmetric, etc.) dictated by the system administrator. Authorized players can recall the stored game set and apply the game set while playing the game at the game terminal. Even selectable game-play features that are not available for modification at the game terminal (i.e., enhanced sets) can be downloaded as part of a stored game set and played while at the game terminal. Player accounts can include multiple stored game sets and preset game sets. The Personalize screen 800 provides a "Save" button 805 for saving the current setting to the memory storage site. Additionally, the "Default" button 803 and the "Saved Set" buttons 804 can recall saved sets for modification and for applying while playing the video poker game.

Another feature included in the video poker game is the "Did You Know . . . " screen. "Did You Know . . . " screens can provide various facts, tips, trivia, and other helpful information related to the different games, features, and aspects of the video poker game. "Did You Know . . . " can be displayed while new games or features are being loaded and when game-play has momentarily halted.

It should be understood that the above invention is not limited to a video poker game and may be instituted on a video slot machine, mechanical slot machine, networked and standalone systems, or another means sufficient to practice the inventive concepts disclosed herein.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system including a random element generator, one or more controllers, and a gaming terminal, the gaming terminal primarily dedicated to playing at least one casino wagering game, the gaming terminal including a gaming cabinet, and electronic display device, and an electronic input device, the cabinet constructed to house components associated with the casino wagering game, the electronic display device and the electronic input device being coupled to the gaming cabinet, the method comprising:

receiving, responsive to a physical input to the electronic input device of the gaming terminal, a wager input to initiate the casino wagering game;

displaying, on the electronic display device, a first plurality of selectable game-play features of the casino wagering game as being customizable by a player at the gaming terminal;

displaying, on a display device connected to a remote device that is not primarily dedicated to playing a wagering game, a second plurality of selectable game-play features of the casino wagering game as being customizable by the player at the remote device, the second plurality including at least one selectable game-play feature of the first plurality and at least one selectable game-play feature not in the first plurality;

receiving, responsive to one or more physical inputs from the player, one or more selections indicative of selectable game-play features to be customized, the selections being from at least the second plurality and including the at least one selectable game-play feature that is not in the first plurality;

generating one or more random elements with the random element generator;

determining, by the one or more controllers, an outcome of the casino wagering game based, at least in part, on the one or more random elements;

displaying the outcome on the electronic display device of the gaming terminal; and displaying, as customized by the player and on the electronic display device, any game-play features of the first and second pluralities selected for customization and implemented during game-play at the gaming terminal.

2. The method of claim 1, wherein at least one of the selectable game-play features of at least one of the first and second pluralities includes a selection of one of a plurality of wagering games offered for play on the gaming terminal.

3. The method of claim 1, wherein at least one of the selectable game-play features of at least one of the first and second pluralities includes a visual characteristic of the casino wagering game.

4. The method of claim 1, wherein at least one of the selectable game-play features of at least one of the first and second pluralities includes a bonus feature of the casino wagering game.

5. The method of claim 1, wherein at least one of the selectable game-play features of at least one of the first and second pluralities includes an award celebration of the casino wagering game.

6. The method of claim 1, wherein at least one of the selectable game-play features of at least one of the first and second pluralities includes a player-interaction mode of the casino wagering game.

7. The method of claim 1, further comprising, prior to displaying the first or second plurality, accessing the respective first or second plurality by logging into a player account.

8. The method of claim 7, further comprising, after displaying the first or second plurality, saving the respective first or second plurality as customized in the player account.

9. A network-connected gaming system configured to customize game-play, the gaming system comprising:

a gaming terminal primarily dedicated to playing at least one casino wagering game, the gaming terminal including a gaming cabinet, an electronic display device, and an electronic input device, the electronic display device and the electronic input device being coupled to the gaming cabinet, the electronic input device configured to receive a physical input from a player to initiate the casino wagering game and transform the input into an electronic data signal;

a random element generator configured to generate one or more random elements; and one or more controllers configured to:

receive, responsive to a physical input to the electronic input device of the gaming terminal, a wager input to initiate the casino wagering game;

display, on the electronic display device, a first plurality of selectable game-play features of the casino wagering game as being customizable by the player at the gaming terminal;

display, via a display device connected to a remote device that is not primarily dedicated to playing a wagering game, a second plurality of selectable game-play features of the casino wagering game as being customizable by the player at the remote device, the second plurality including at least one selectable game-play feature of the first plurality and at least one selectable game-play feature not in the first plurality;

receive, responsive to one or more physical inputs from the player, one or more selections indicative of one or more selectable game-play features to be customized, the selections being from at least the second plurality and including the at least one selectable game-play feature that is not in the first plurality;

generate one or more random elements with the random element generator;

determine, by the one or more controllers, an outcome of the casino wagering game based, at least in part, on the one or more random elements;

display the outcome on the electronic display device of the gaming terminal; and display, as customized by the player and on the electronic display device, any game-play features of the first and second pluralities selected for customization and implemented during game-play at the gaming terminal.

10. The gaming system of claim 9, wherein the one or more controllers are further configured to, prior to displaying the first or second plurality, receive log-in information for accessing a player account associated with the respective first or second plurality.

11. The gaming system of claim 9, wherein the one or more controllers are further configured to display, via the display device connected to the remote device, special features related to game-play, the special features being available for accrual from the remote device but not from the gaming terminal, and the special features being downloadable for use during game-play on the gaming terminal.

12. The gaming system of claim 9, wherein the one or more controllers are further configured to save the accrued special features in a player account associated with the player for use in subsequent game-play on the gaming terminal.

13. The gaming system of claim 9, wherein at least one of the selectable game-play features of at least one of the first and second pluralities includes a selection of one of a plurality of wagering games offered for play on the gaming terminal.

14. The gaming system of claim 9, wherein at least one of the selectable game-play features of at least one of the first and second pluralities includes a visual characteristic of the casino wagering game.

15. A networked gaming terminal primarily dedicated to playing at least one casino wagering game, the gaming terminal comprising:

a gaming cabinet for housing components associated with the casino wagering game;

an electronic display device coupled to the gaming cabinet;

an electronic input device coupled to the gaming cabinet, the electronic input device configured to receive a physical input from a player to initiate the casino wagering game and transform the input into an electronic data signal; and one or more controllers disposed within the gaming cabinet and including a random element generator, the random element generator configured to generate one or more random elements, the one or more controllers configured to:

receive, responsive to a physical input to the electronic input device of the gaming terminal, a wager input to initiate the casino wagering game;

display, on the electronic display device, a first plurality of selectable game-play features of the casino wagering game as being customizable by the player at the gaming terminal;

receive, from the player at the gaming terminal, an input indicative of a selection to customize a first game-play feature of the first plurality;

display, via a display device connected to a remote device that is not primarily dedicated to playing a wagering game, a second plurality of selectable game-play features of the casino wagering game as being customizable by the player at the remote device, the second plurality including at least one game-play feature of the first plurality and at least one game-play feature not included in the first plurality;

receive, from the player at the remote device, an input indicative of a selection to customize a second game-play feature of the second plurality, the selection from the second plurality including the at least one game-play feature not included in the first plurality;

generate one or more random elements with the random element generator;

determine, by the one or more controllers, an outcome of the casino wagering game based, at least in part, on the one or more random elements;

display the outcome on the electronic display device of the gaming terminal; and display, as customized by the player and on the electronic display device, any game-play features of the first and second pluralities selected for customization and implemented during game-play on the gaming terminal.

16. The gaming terminal of claim 15, wherein the first and second game-play features remain as customized during subsequent game-play sessions until customized again by the player.

17. The gaming terminal of claim 15, wherein the one or more controllers are further configured to, prior to displaying the first or second plurality, receive log-in information for accessing a player account associated with the respective first or second plurality.

18. The gaming terminal of claim 17, wherein one or more controllers are further configured to:

after displaying the first and second pluralities during game-play on the gaming terminal, save, in the player account, the first and second pluralities;

initiate, in response to another input from the player at a different gaming terminal, a subsequent game-play session on the different gaming terminal; and display, as customized by the player and via at least one display connected to the different gaming terminal, the first and second pluralities when implemented during game-play on the different gaming terminal.

19. The gaming terminal of claim 15, wherein the first plurality is either a default plurality of game-play features or a previously-saved plurality of selectable game-play features, and the second plurality is either a default plurality of selectable game-play features or a previously-saved plurality of selectable game-play features.

* * * * *

UNITED STATES PATENT AND TRADEMARK OFFICE

CERTIFICATE OF CORRECTION

PATENT NO. : 9,058,717 B2
APPLICATION NO. : 14/088857
DATED : June 16, 2015
INVENTOR(S) : Dion K. Aoki, Allon G. Englman and Joel R. Jaffe It is certified that error appears in the above-identified patent and that said Letters Patent is hereby corrected as shown below:

In the claims

In Column 23, Line 13, Claim 18, insert -- the selectable game-play features of -- after “terminal,”

Signed and Sealed this
Twenty-seventh Day of October, 2015

Michelle K. Lee
*Director of the United States Patent and Trademark Office*